(12) United States Patent
Schneider

(10) Patent No.: US 10,393,157 B2
(45) Date of Patent: Aug. 27, 2019

(54) RELEASABLE CUSHION-TYPE SUPPORT ARRANGEMENT FOR AN ITEM SUCH AS A USER INTERFACE DEVICE

(71) Applicant: Ergonomic Ingenuity, LLC, Milwaukee, WI (US)

(72) Inventor: Paul W. Schneider, Hartland, WI (US)

(73) Assignee: Ergonomic Ingenuity, LLC, Milwaukee, WI (US)

( * ) Notice: Subject to any disclaimer, the term of this patent is extended or adjusted under 35 U.S.C. 154(b) by 239 days.

(21) Appl. No.: 14/849,325

(22) Filed: Sep. 9, 2015

(65) Prior Publication Data

US 2016/0066717 A1 Mar. 10, 2016

Related U.S. Application Data

(60) Provisional application No. 62/048,674, filed on Sep. 10, 2014.

(51) Int. Cl.
*A47B 23/00* (2006.01)
*F16B 1/00* (2006.01)
*G06F 3/039* (2013.01)
*G06F 1/16* (2006.01)

(52) U.S. Cl.
CPC .............. *F16B 1/00* (2013.01); *G06F 1/1628* (2013.01); *G06F 1/1656* (2013.01); *G06F 1/1679* (2013.01); *G06F 3/039* (2013.01); *A45F 2200/0525* (2013.01); *F16B 2001/0028* (2013.01); *F16B 2001/0035* (2013.01)

(58) Field of Classification Search
CPC ...................................................... A47B 23/00

USPC ....................................................... 5/639–640
See application file for complete search history.

(56) References Cited

U.S. PATENT DOCUMENTS

| 1,928,806 | A | 10/1933 | Barcalo |
| 1,934,254 | A | 11/1933 | Barcalo |
| 4,018,479 | A | 4/1977 | Ball |
| 4,162,696 | A | 7/1979 | Sprung |
| 4,837,590 | A | 6/1989 | Sprague |

(Continued)

OTHER PUBLICATIONS

PCT/US2015/049308, International Search Report and Written Opinion, dated Dec. 18, 2015, 14 pages.

(Continued)

*Primary Examiner* — Fredrick C Conley
(74) *Attorney, Agent, or Firm* — Boyle Fredrickson, S.C.

(57) ABSTRACT

A support for an item such as a user interface device includes a cushion member defining an exterior and an interior. A releasable connection arrangement between the item and the cushion member includes a first connector carried by the item and a second connector carried by the cushion member. The connectors are releasably engageable for releasably engaging the item with the cushion member. The first connector may be located within an interior defined by the item, and in one form may be a portion of an internal structure of the item. Alternatively, the item may define an exterior surface, and the first connector may be secured to the exterior surface of the item. The cushion member may define an exterior, and the second connector may be located on the exterior of the cushion member. The first and second connectors may be magnetically attractive connectors or mechanical connectors, e.g. hook-and-loop connectors.

24 Claims, 35 Drawing Sheets

(56) References Cited

U.S. PATENT DOCUMENTS

| | | | |
|---|---|---|---|
| RE33,402 E | 10/1990 | Thrush | |
| D313,917 S | 1/1991 | Valliere | |
| 5,002,184 A | 3/1991 | Lloyd | |
| 5,029,260 A | 7/1991 | Rollason | |
| 5,115,374 A | 5/1992 | Hongoh | |
| RE33,970 E | 6/1992 | Butler | |
| 5,134,245 A | 7/1992 | Katz | |
| 5,214,574 A | 5/1993 | Chang | |
| 5,217,119 A | 6/1993 | Hollingsworth | |
| D358,270 S | 5/1995 | Diamond | |
| 5,485,922 A | 1/1996 | Butcher | |
| 5,494,157 A | 2/1996 | Golenz et al. | |
| 5,570,780 A | 11/1996 | Miller | |
| D376,948 S | 12/1996 | Sullins et al. | |
| 5,607,054 A | 3/1997 | Hollingsworth | |
| 5,623,869 A * | 4/1997 | Moss | A47B 23/002 108/43 |
| 5,632,373 A | 5/1997 | Kumar et al. | |
| 5,639,044 A | 6/1997 | Carlton et al. | |
| 5,647,484 A | 7/1997 | Fleming | |
| 5,666,265 A | 9/1997 | Lutz et al. | |
| 5,682,993 A | 11/1997 | Song | |
| D389,360 S | 1/1998 | York et al. | |
| 5,725,090 A | 3/1998 | Vermillion et al. | |
| 5,729,549 A | 3/1998 | Kostreski et al. | |
| D398,914 S | 9/1998 | Pulver | |
| 5,819,942 A | 10/1998 | Sadow | |
| 5,835,344 A | 11/1998 | Alexander | |
| 5,893,540 A * | 4/1999 | Scott | A47B 23/001 108/43 |
| 5,905,719 A | 5/1999 | Arnold et al. | |
| D415,532 S | 10/1999 | Tobin | |
| 6,050,200 A | 4/2000 | Sullins et al. | |
| 6,179,122 B1 | 1/2001 | Moncrief et al. | |
| D476,662 S | 7/2003 | Knieper | |
| 6,758,332 B2 | 7/2004 | Miller et al. | |
| 6,820,852 B2 | 11/2004 | Wainscott et al. | |
| 6,862,171 B1 | 3/2005 | Maskatia et al. | |
| 7,280,355 B2 | 10/2007 | Taylor | |
| 8,205,850 B2 | 6/2012 | Opresnik | |
| 8,757,374 B1 | 6/2014 | Kaiser | |
| 2004/0228084 A1 | 11/2004 | Zarek et al. | |
| 2006/0138297 A1 | 6/2006 | Esimai | |
| 2006/0152892 A1 | 7/2006 | Matsumoto et al. | |
| 2006/0165230 A1 | 7/2006 | Parr | |
| 2006/0274045 A1 | 12/2006 | Stenbroten | |
| 2008/0150662 A1 * | 6/2008 | Broumand | G06F 3/02 335/285 |
| 2009/0235458 A1 * | 9/2009 | Yarmer | A47G 9/1045 5/639 |
| 2010/0326330 A1 * | 12/2010 | Sween | G06F 1/203 108/41 |
| 2011/0056413 A1 | 3/2011 | Andochick | |
| 2013/0249467 A1 | 9/2013 | Varghese | |

OTHER PUBLICATIONS

Amazon.com, "Lapp Topper Vinyl & Plastic Lap Desk (Navy Blue)," downloaded Jun. 20, 2011.

Amazon.com, "Lapp Topper Vinyl & Plastic Lap Design (Navy Blue)", customer review of P.J. Woods dated Oct. 13, 2006, downloaded Jun. 20, 2011.

EP 15840897, European Search Report, dated Mar. 18, 2018, 6 pages.

* cited by examiner

RELEASABLE CUSHION-TYPE SUPPORT ARRANGEMENT FOR AN ITEM SUCH AS A USER INTERFACE DEVICE

CROSS REFERENCE TO RELATED APPLICATION

This application claims the benefit of U.S. provisional patent application Ser. No. 62/048,674 filed Sep. 10, 2014, the entire contents of which is hereby expressly incorporated by reference.

BACKGROUND AND SUMMARY

This invention relates to a user input or interface device, and more particularly to a releasable cushioned support arrangement for a user input bar interface device.

It is known to support a user input or interface device using a cushion arrangement. Such a cushioned support arrangement is shown, for example, is Schneider U.S. Pat. No. 8,786,545 issued Jul. 22, 2014 and U.S. Pat. No. 8,519,946 issued Aug. 27, 2013, the entire disclosures of which are hereby expressly incorporated by reference. The '545 and '946 patents disclose a support that includes a user input or interface device mounting area, with a lower area below the user input or interface device that defines a downwardly facing conformable lower surface. At least the lower area of the support has a variably shaped displaceable material with a shape independent of the shape of the user input or interface device. The variably shaped displaceable material enables the lower area of the support member, including the downwardly facing lower surface, to displace and conform to the contours of the surface on which the support member is placed independent of the shape of the user input or interface device. In this manner, the user can place the support on an irregular or uneven surface, and the orientation of the user input or interface device can be varied as desired.

Is an object of the present invention to provide a cushion-type support arrangement for an item, such as a user input or interface device, which is releasably engageable with the device. It is another object of the invention to provide such a support arrangement that can easily be incorporated into a conventional cushion or pillow. It is a further object of the invention to provide such a support arrangement that can be used with various different types of and sizes of items, including user input or interface devices. Yet another object of the invention is to provide such a support arrangement that is relatively inexpensive to manufacture yet which provides a significant benefit in supporting an item such as a user input or interface device. A still further object of the invention is to provide such a support arrangement which may be retrofitted to existing cushion-type support members.

In accordance with a first aspect of the present invention, a support arrangement for an item includes a cushion member defining an exterior and an interior having cushion material. A releasable connection arrangement is interposed between the item and the cushion member and includes a first connection member carried by the item and a second connection member carried by the cushion member. The first and second connection members are selectively and releasably engageable for releasably engaging the item with the exterior of the cushion member. The item may be in the form of a user interface device that requires user inputs such as, but not limited to, a tablet computer, a keyboard, a game controller, a remote control device, a laptop or notebook computer, etc. In one embodiment, the first and second connection members may be in the form of magnetically attractive connection members. In another embodiment, the first and second connection members may be in the form of non-magnetically attractive mechanical or physical connection members that can be selectively and releasably engaged with each other, e.g. a hook-and-loop connection arrangement.

In the case of magnetically attractive connection members, the first magnetically attractive connection member may be located within an interior defined by the item, and in one form may be a portion of an internal structure of the item. Alternatively, the item may define an exterior surface, and the first magnetically attractive connection member may be secured to the exterior surface of the item. The cushion member may define an exterior, and the second magnetically attractive connection member may be located on the exterior of the cushion member. Alternatively, the second magnetically attractive member may be located in the interior of the cushion member.

In the case of non-magnetically attractive connection members, the first connection member may be secured to an exterior surface of the item. The cushion member may define an exterior, and the second connection member may be located on the exterior of the cushion member.

In accordance with another aspect of the invention, a method of supporting an item includes the acts of providing an item that includes a first connection member and providing a cushion member that includes a second connection member. The second connection member is selectively and releasably engageable with the first connection member, such that engagement of the second connection member with the first connection member is operable to releasably engage the item with the cushion member. In one embodiment, the first and second connection members may be in the form of magnetically attractive connection members. In another embodiment, the first and second connection members may be in the form of non-magnetically attractive physical or mechanical connection members that can be selectively and releasably engaged with each other, e.g. a hook-and-loop connection arrangement.

In the case of magnetically attractive connection members, the act of providing an item that includes a first connection member may be carried out by providing an item, such as a user interface device, having one or more first magnetically attractive connection members contained within an interior defined by the item. Alternatively, the act of providing an item that includes a first magnetically attractive connection member may be carried out by securing a first magnetically attractive connection member to an exterior surface defined by the item. The act of providing a cushion member that includes a second magnetically attractive connection member may be carried out by securing the second magnetically attractive connection member to an exterior defined by the cushion member. Alternatively, the act of providing a cushion member that includes a second magnetically attractive connection member may be carried out by positioning the second magnetically attractive connection member within an interior defined by the cushion member.

In the case of non-magnetically attractive mechanical or physical connection members, the act of providing an item that includes a first connection member may be carried out by providing an item, such as a user interface device, having one or more first connection members secured to an exterior surface defined by the item. The act of providing a cushion member that includes a second connection member may be carried out by providing a cushion member having a second connection member secured to an exterior defined by the cushion member.

In accordance with yet another aspect of the present invention, a support assembly for an item, such as a user interface device, comprises a cushion member, a first connector member; and a second connector member. The first connector member is adapted to be secured to and carried by the item and the second connector member is secured to and carried by the cushion member. When the first connector member is secured to the item and the second connector member is secured to the cushion member, the first and second connector members are selectively and releasably engageable with each other to enable the item to be supported by the cushion member. In one embodiment, the first and second connector members may be in the form of magnetically attractive connector members. In another embodiment, the first and second connector members may be in the form of non-magnetically attractive connector members that can be selectively and releasably engaged with each other, e.g. a hook-and-loop connection arrangement. In the case of magnetically attractive connector members, the second magnetically attractive connector member may be fixedly engaged with the cushion member. The second magnetically attractive connector member may be adapted to be positioned within an interior defined by the cushion member, or alternatively may be adapted to be secured to an exterior defined by the cushion member. The first magnetically attractive connector member may be adapted to be secured to an exterior surface defined by the item. An adhesive device may be provided for selectively securing the first magnetically attractive connector member to the exterior of the item. In the case of non-magnetically attractive connector members, the second connector member may be fixedly engaged with the cushion member, such as on an exterior defined by the cushion member. The first connector member may be adapted to be secured to an exterior surface defined by the item. An adhesive device may be provided for selectively securing the first connector member to the exterior of the item These and other features, objects, advantages and aspects of the present invention will be better appreciated and understood when considered in conjunction with the following description and the accompanying drawings. It should be understood, however, that the following description, while indicating a representative embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
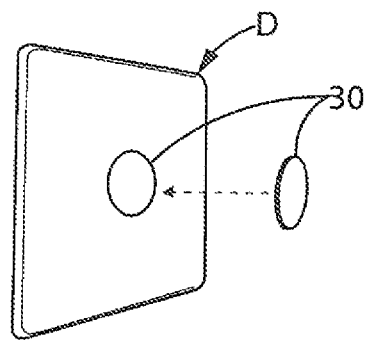
FIG. 1 is an isometric view illustrating a representative item, in the form of a user input or interface device, and a first magnetically attractive connection member adapted for engagement with the user input or interface device, in accordance with the present invention.

In describing the embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected, attached, or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiment described in detail in the following description.

Referring to FIG. 1, an item, in the form of a user input or interface device shown at D, is provided with a first engagement or connection member 30. In a manner to be explained, the first connection member 30 is engageable with a second engagement or connection member in order to provide a support arrangement for the user input or interface device D. The user input or interface device D is representatively illustrated as a tablet computer, and the first connection member 30 is shown as being secured to the rear surface of the tablet computer. It is understood, however, that the item such as the user interface device D may be any of a number of items such as devices that provide a user interface or allow user inputs. Such devices include, but are not limited to, devices such as smart phones, electronic readers, remote control devices (such as a remote control for a television, computer, sound system, blue ray player, home security system, appliance, etc.), game controllers, keyboards, keypads, etc.

Figure 2:
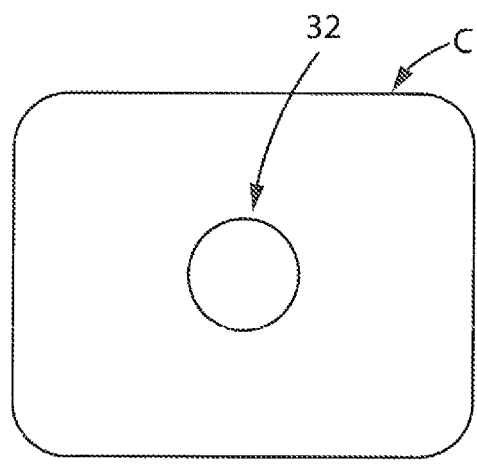
FIG. 2 is a view of a cushion-type support member that includes a second engagement magnetically attractive connection member adapted to engage the first magnetically attractive connection member, in accordance with the present invention.

FIG. 2 illustrates a cushion-type support member, shown at C, which is provided with an engagement area 32 that includes a second engagement or connection member with which the first connection member 30 is selectively engaged for releasably securing device D to support member C. The cushion-type support member C may be take any satisfactory form, such as a conventional pillow or cushion, having a construction in which at least the lower regions are conformable to the contours of a surface on which it is placed. The cushion-type support member C may have any desired configuration such as, but not limited to, a rectangle, square, circle, oval or any other shape, or an irregular shape such as an animal or character.

Figure 12:
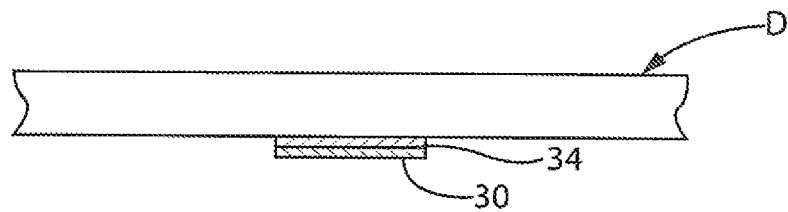
FIG. 12 is a partial section view taken along line 12-12 of FIG. 4, showing an arrangement for securing the first magnetically attractive connection member to the user input or interface device.

Referring to FIG. 12, the first connection member 30 may be in the form of a magnetically attractive member that is secured to the rear surface of the device D. The first connection member 30 may itself be a magnet, or alternatively may be formed of a material that is magnetically attractive. As shown in FIG. 12, the first connection member 30 may be secured to the rear wall of the device D via an adhesive layer 34, one surface of which is adhered to the rear wall of device D and the other surface of which is adhered to the first connection member 30. The adhesive layer 34 may be carried by the surface of first connection member 30, such that a backing layer can be removed from the adhesive layer 34 to enable the first connection member 30 to be adhesively secured to the rear wall of device D. It is understood, however, that any other satisfactory securement arrangement may be employed to secure first connection member 30 to the rear wall of device D.

Figure 13:
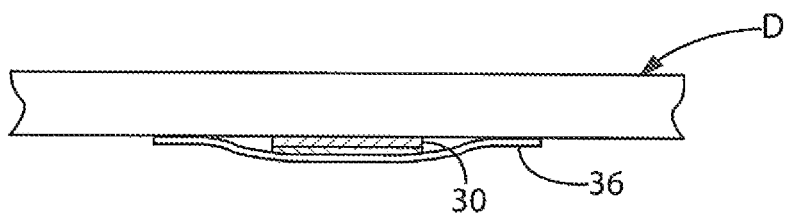
FIG. 13 is a view similar to FIG. 12, illustrating an alternative arrangement for securing the first magnetically attractive connection member to the user input or interface device.

FIG. 13 illustrates an alternative arrangement for securing first connection member 30 to the rear wall of device D. In this embodiment, an adhesive member 36 is employed to secure the first connection member 32 to device D. The adhesive member 36 may be in the form of adhesive strip or patch, which includes portions that extend beyond the periphery of first connection member 30 and that can be adhesively secured to the rear surface of device D. The adhesive member 36 may be configured to overlie and enclose first connection member 30 in its entirety, or alternatively may be configured to leave portions of first connection member 30 exposed.

In either the embodiment of FIG. 12 or FIG. 13, the first connection member 30 may be provided separately from the device D so as to be securable to the device D by a user, using the adhesive layer 34 or the adhesive member 36.

Again, while securement of first connection member 30 to device D is shown as being via an adhesive connection, it is understood that any other satisfactory means of securement may be employed.

Figure 14:
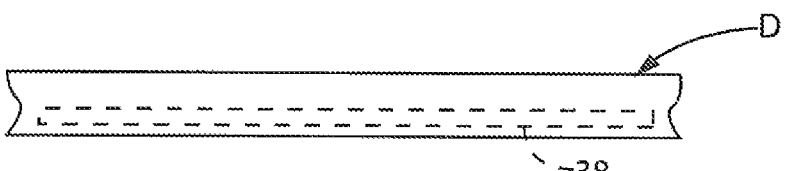
FIG. 14 is a view similar to FIGS. 12 and 13, illustrating an alternative arrangement in which the magnetically attractive connection member is incorporated in the user input or interface device.
Figure 14A:
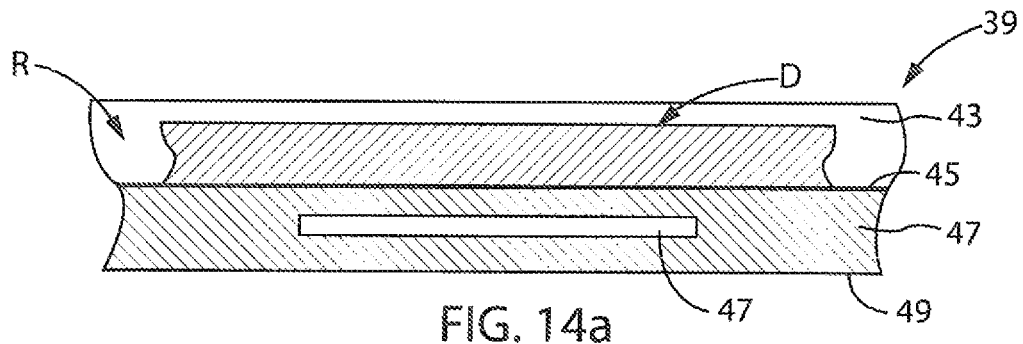
FIG. 14a is a view similar to FIGS. 12-14, illustrating an alternative arrangement in which the magnetically attractive connection member is associated with a case or protective device for the user input or interface device.

FIG. 14 illustrates an alternative arrangement that may be employed for securing a device D to support member C. In this arrangement, the device D includes an internal component 38 that is magnetically attractive. The internal component 38 may, for example, be in the form of a frame or other internal structure associated with the device D, which may representatively be the case if device D is in the form of a keyboard or the like. Alternatively, the magnetically attractive internal component 38 may be in the form of one or more magnets that are incorporated into the device D at the time of manufacture, which may representatively be the case if device D is in the form of a tablet computer or the like. FIG. 14a illustrates another alternative arrangement, which contemplates device D mounted, secured, or engaged with a case or other protective device, shown at 39. Typically, the case or protective device 39 includes a bottom or rear wall 41 that underlies portions or all of the rear surface of device D, in combination with other structure that extends upwardly from bottom or rear wall 41 and that extends adjacent to portions or all of the sides of the device D. Such other structure is representatively shown in FIG. 14a as a sidewall 43. It is understood that sidewall 43 as illustrated is representative of myriad full-length or partial-length sidewall constructions that are known or possible for use in a case or protective device to protect the sides of the device D and/or engage the device D with the case or protective device 39, in a manner as is known. Typically, the sidewall 43 and the upwardly facing surface of bottom or rear wall 41, shown at 45, cooperate to form a recess R within which the device D is located. The recess R may extend about portions of, or the entire periphery of, device D. In this embodiment, a magnetically attractive member, shown at 47, is carried by case or protective device 39. In the illustrated embodiment, the magnetically attractive member 47 is embedded within the material of bottom wall 41. It is understood, however, that magnetically attractive member 47 may alternatively be secured to a surface of case or protective device 39, e.g. to the upwardly facing surface 45 of bottom wall 41 or its downwardly facing surface, shown at 49, or within a recess defined by any such surface. In the latter case, the magnetically attractive member 47 may be enclosed by a door or cover.

Figure 15:
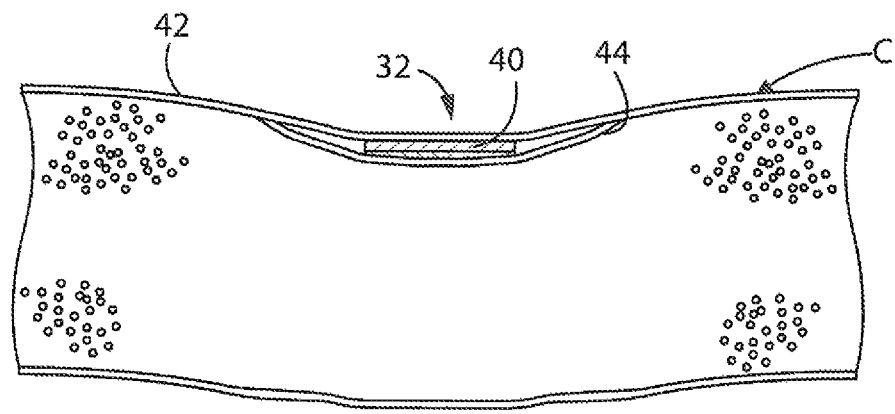
FIG. 15 is a partial section view taken along line 15-15 of FIG. 4, showing an arrangement for securing the second magnetically attractive connection member to the cushion-type support member.

Referring to FIG. 15, the engagement area 32 of cushion-type support member C is provided with the second connection member, shown at 40. In the same manner as first connection member 30, the second connection member 40 is in the form of a magnetically attractive member that is secured to and carried by cushion-type support member C. The second connection member 40 may itself be a magnet, or alternatively may be formed of a material that is magnetically attractive. In the event the first connection member 30 is in the form of a magnet, the second connection member 40 may also be a magnet or alternatively may be formed of a magnetically attractive material. Conversely, in the event the second connection member 40 is in the form of a magnet, the first connection member 30 may also be a magnet or alternatively may be formed of a magnetically attractive material.

Figure 16:
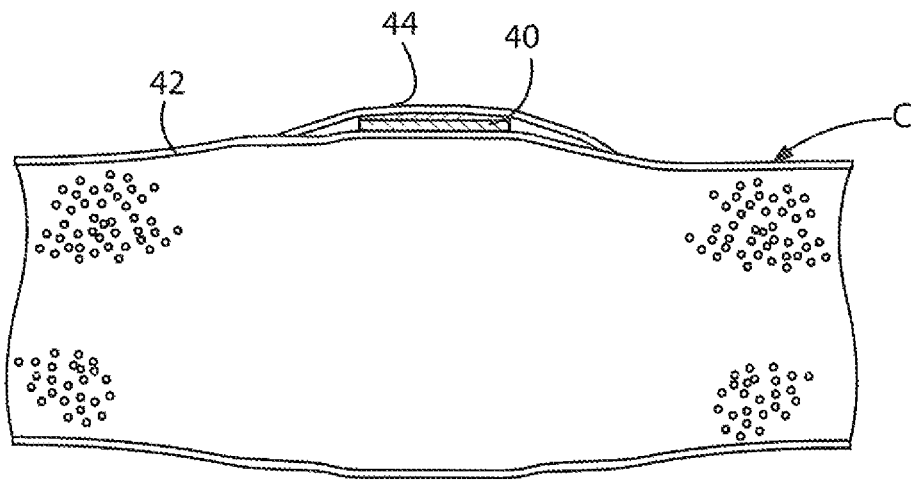
FIG. 16 is a view similar to FIG. 15, illustrating an alternative arrangement for securing the second magnetically attractive connection member to the cushion-type support member.

In the embodiment illustrated in FIG. 15, the second connection member 40 is in the form of a disk-type magnetically attractive member that is contained within a pocket associated with cushion-type support member C. In this embodiment, the second connection member 40 is located adjacent a surface of the cushion-type support member C, such that only the outer layer or casing of support member C, shown at 42, overlies second connection member 40. The pocket within which the second connection member 40 is contained is defined by a panel 44 located within the interior of the support member C. Alternatively, as shown in FIG. 16, the second connection member 40 may be placed on the outwardly facing surface of the outer layer or casing 42, and the pocket may be formed by an external patch or panel of material 44 that is secured to the outer layer or casing 42 over the second connection member 40. Still further, the second connection member 40 may be positioned within the interior of the support member C at a location spaced from either surface of support member C. In this manner, the second connection member 40 is surrounded by the internal cushion material of support member C so as to cushion against engagement with second connection member 40 when support member C is used other than as an interface device support, such as in use as a pillow, cushion, etc. Rather than having a disk-type configuration as shown, it is understood that the connection member 40 may alternatively have a ring-type configuration or a configuration in which a series of individual magnetically attractive members are arranged in a circular pattern.

As noted above, the internal cushion material of support member C may be any satisfactory type of known cushioning material. Examples include, but are not limited to, cushioning configurations as shown and described in the previously-mentioned Schneider U.S. Pat. Nos. 8,519,706 and 8,780,545. Other types of cushioning arrangements and materials include foam materials, bead materials including microbeads, feather or down materials, pellet materials, beanbag materials, seed materials, wool, horsehair, buckwheat, shredded rubber, silk, hemp, etc., or any combination thereof. The internal cushion material of support member C may be homogenous throughout the interior or support member C, or alternatively may be formed of different layers or areas of cushioning materials. It can be appreciated that the present invention may be employed with a support member C formed of any type of cushion material or combination of cushion materials, in any desired construction.

Figure 3:
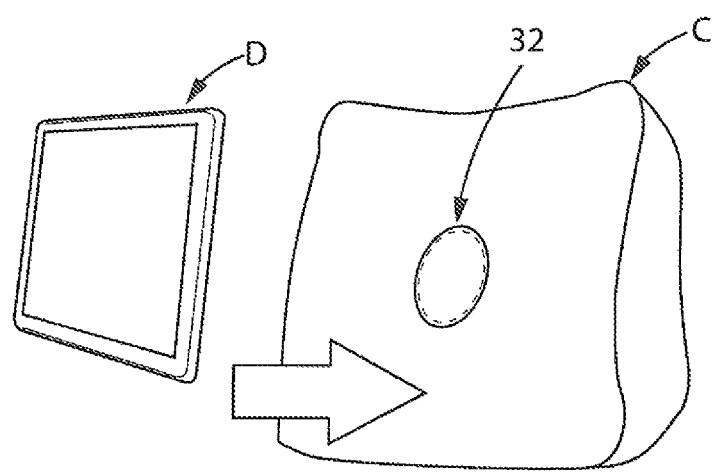
FIG. 3 is an isometric view illustrating the user input or interface device of FIG. 1 and the cushion-type support member of FIG. 2 prior to engagement of the first and second magnetically attractive connection members.
Figure 4:
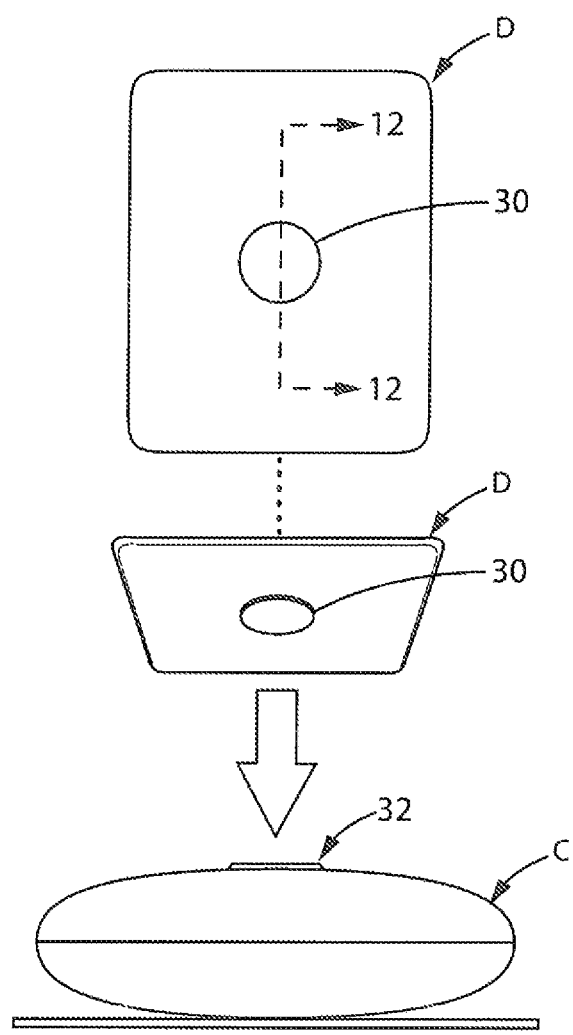
FIG. 4 is a view similar to FIG. 3 showing the user input or interface device and the cushion-type support member from a different angle.
Figure 5:
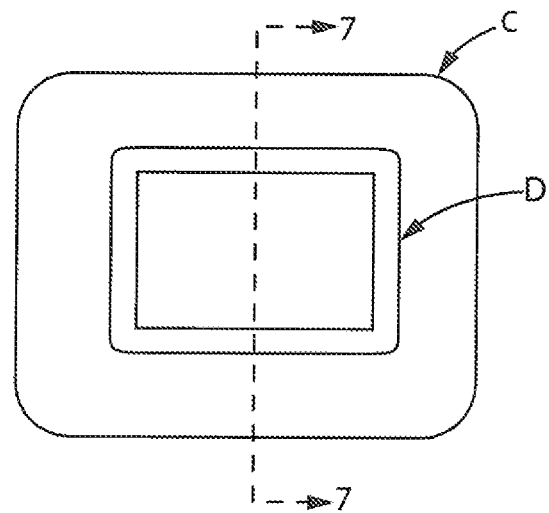
FIG. 5 is a plan view showing the user input or interface device of FIG. 1 and the cushion-type support member of FIG. 2 when the first and second magnetically attractive connection members are engaged together for supporting the user input or interface device on the cushion-type support member.
Figure 6:
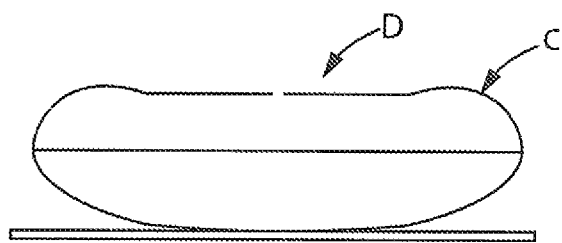
FIG. 6 is a side elevation view showing the user input or interface device and the cushion-type support member as in FIG. 5.
Figure 7:
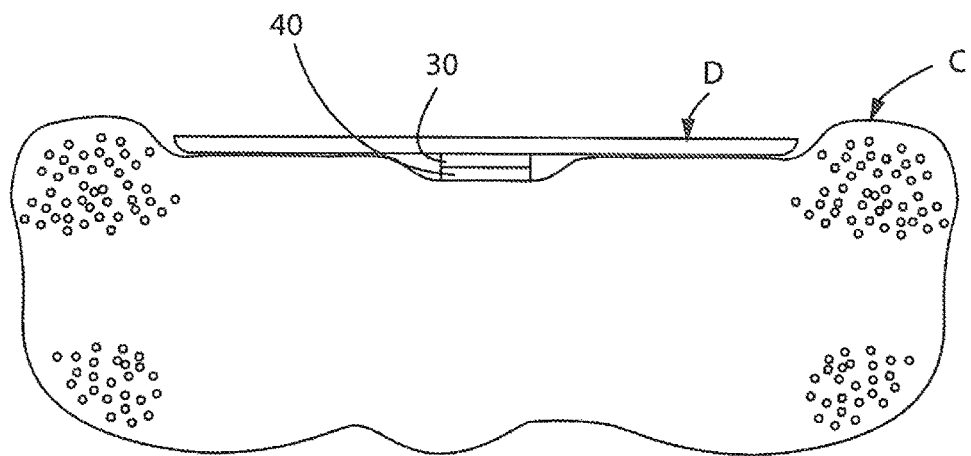
FIG. 7 is a section view taken along line 7-7 of FIG. 5.

FIGS. 3 and 4 illustrate advancement of interface device D toward support member C, in which the user moves interface device D toward support member C in a position such that first connection member 30 is generally aligned with engagement area 32. As the rear surface of interface device D approaches the facing surface of support member C, the magnetic attraction between first connection member 30 and a second connection member 40 functions to move the connection members 30, 40 together. When this occurs, the portion of support member C surrounding the second connection member 30 may deform outwardly as second connection member 40 is magnetically attracted to and magnetically engages first connection member 30. The user continues to move interface device D toward the facing surface of support member C, so that interface device D is positioned against the surface of support member C, as shown in FIG. 7. As can be appreciated, when interface device D is engaged with the surface of support member C, the weight of interface device D may cause a recess, shown at 44, to be formed in the surface of support member C. Alternatively, the interface device D may simply rest against the surface of support member C without forming a recess. Generally, however, due to the inherent "give" provided by cushion materials, the recess 44 will be formed and will conform to the footprint of interface device D, with the portions of support member C located outwardly of the periphery of interface device D deforming upwardly via displacement of the cushion material so as to surround the interface device D. It should be appreciated, however, that support member C may alternatively be sized smaller than interface device D such that, when interface device D is engaged with the surface of the support member C, the interface device D overlies the entire facing surface of support member C without any portions of support member C being located outwardly of the periphery of interface device D and thus without any recess being formed. In an arrangement such as this, or when the cushion materials of support member C do not allow formation of a recess 44, the device D simply rests or "perches" on top of the support member C.

In addition, in an alternative construction, the support member C may be provided with a rigid or semi-rigid material or layer at or below the surface with which interface device D is engaged. In this construction, a rigid or semi-rigid support is provided for the interface device D, with the cushion material of support member C being located below the rigid or semi-rigid layer. In such a construction, the interface device D may not form a recess in the surface of the support member C with which it is engaged, or alternatively a relatively shallow recess may be formed. Again, the rigid or semi-rigid material layer may have a footprint that is either larger or smaller than the periphery of the interface device D.

In use, the user is able to place support member C on a surface such that interface device D faces upwardly toward the user. Support member C may be placed on a surface having an irregular configuration such as, for example, the user's lap, legs or knees, or any other regular or irregular surface. The cushion material of support member C at the lower area of the support member C can assume different shapes and configurations corresponding to the surface on which support member C is placed, such that the cushion material displaces and/or deforms so as to at least partially assume the contours of the irregular surface, which provides a comfortable and variably positionable support for the interface device D. The contours of the lower area of support member C are independent of the shape of the user interface device D. The user can thus adjust the angle of the interface device D to any desired angle while the lower area of support member C remains engaged with the irregular surface, and the cushioning material of the support member C adjusts and conforms to such variations in position of interface device D.

Figure 8:
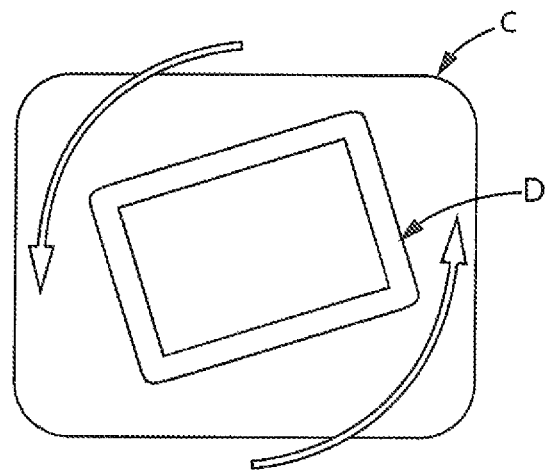
FIG. 8 is a plan view similar to FIG. 5, showing the ability to adjust the orientation of the user input or interface device relative to the cushion-type support member when the first and second magnetically attractive connection members are engaged.

In addition, as shown in FIG. 8, the position of interface device D on the surface of support member C can be adjusted. That is, in the illustrated embodiment, the single-point, generally central engagement between first connection member 30 and second connection member 40 allows the user to pivot or rotate the interface device D relative to the support member C. This feature provides an added dimension of adjustability between the support member C and the interface device D, which again allows a user to place the interface device D and support member C in any desired position and orientation.

Figure 9:
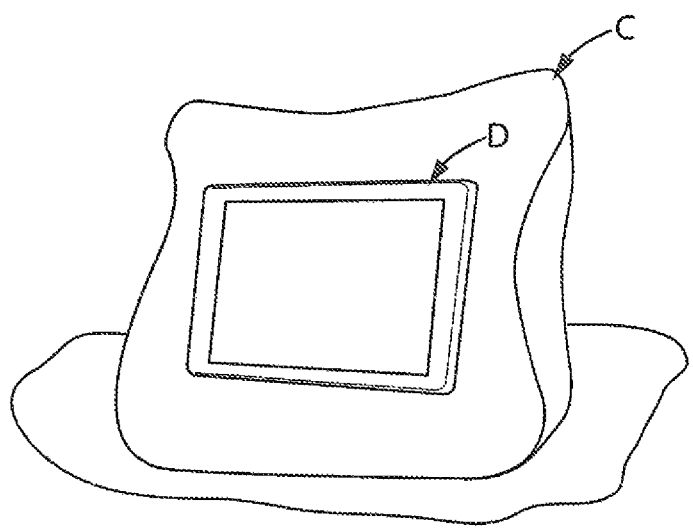
FIG. 9 is an isometric view showing the cushion-type support member positioned so as to support the user input or interface device in an upright orientation.
Figures 10, 11:
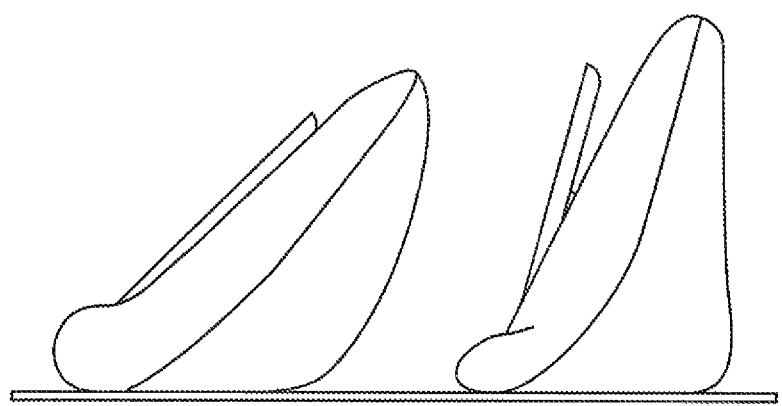
FIGS. 10 and 11 are side elevation views showing the cushion-type support member and the user input or interface device as in FIG. 8, illustrating the ability to adjust the position of the cushion-type support member and thereby the orientation of the user input or interface device.

In some constructions, such as when support member C is formed of a deformable or malleable material that generally stays in different positions, the support member C can be positioned so as to orient the interface device D in a generally upright position, as shown in FIGS. 9-11. Support member C can be placed in such a position when it is engaged with either an irregular surface, such as a user's lap, bed, or article of furniture, or an even surface such as a tabletop, desktop or other generally planar support structure. When support member C is positioned in this manner, the user can manipulate support member C so that the area of support member C below the lower edge of the interface device D is positioned between the support surface and the lower edge of the interface device D, to essentially cradle the bottom of the interface device D. This feature provides an added line of engagement between the interface device D and the support member C, to firmly support the interface device D in the upright orientation. As can be seen in FIGS. 10 and 11, the support member C can be adjusted to varying positions between a more relaxed upright position as shown in FIG. 10 and a more upstanding upright position as shown in FIG. 11.

Representatively, the fabric used to construct some or all of support member C has a certain amount of stretch and resiliency. For example, at least the portion of support member C that carries second connector member 32 is resilient and stretchable in both a length direction and a width direction. In this manner, the fabric of support member C can be stretched and flexed to enable the cushion material of support member 32 to be positioned under and around device D when it is moved to its various positions in order to provide secure support for device D. The support member C may be in the form of an outer cushion or pillow skin or case, within which an inner pillow or cushion is placed. A zipper or other closure may be employed to maintain the inner pillow within the outer case, in a manner as is known. The fabric of both the inner pillow and the outer case may both be formed of a resilient and stretchable material, or alternatively just the fabric of some or all of the outer case may be resilient and stretchable. Alternatively, the support member C may be formed of a single pillow or cushion without an outer skin or case, and in this configuration the fabric of some or all of the fabric of the single pillow or cushion may be resilient and stretchable.

In the foregoing description, the first connection member 30 and the second connection member 40 have been described as being secured or engaged in a magnetically attractive manner. It is understood, however, that the first connection member 30 and second connection member 40 may be releasably secured together via a mechanical or other physical securement arrangement. Examples of such a mechanical or physical engagement arrangement include, but are not limited to, a hook-and-loop engagement arrangement, a snap arrangement, a gripper arrangement, a button arrangement, a clasp arrangement, a hook and eye arrangement, etc. In such a representative mechanical embodiment, the first connection member 30 is in the form of a disk of hook material of a mating hook-and-loop engagement arrangement and the second connection member 40 is in the form of a disk of loop material of the mating hook-and-loop engagement arrangement. One or both of the connection members 30, 40 may alternatively be in the form of a ring. The connection members 30, 40 may alternatively have any other shape or configuration as desired since in an embodiment such as this a circular configuration is unimportant since the pivot or spin feature of the magnetic embodiment is not possible with a direct physical connection.

Figure 16A:
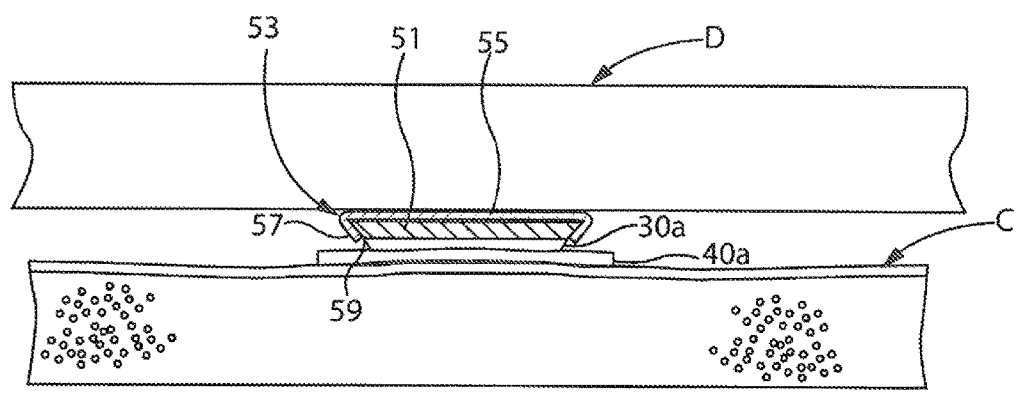
FIG. 16a is a partial section view similar to FIGS. 15 and 16, illustrating an alternative embodiment for a physical or mechanical engagement arrangement incorporating a pivot or spin feature.

FIG. 16*a* illustrates a physical or mechanical engagement arrangement that incorporates a pivot or spin feature. In this embodiment, the first connector member, e.g. a piece of hook material shown at 30*a*, is secured to the outwardly facing surface of a pivot member in the form of a pivot disk 51. The pivot disk 51, in turn is rotatably mounted within a pivot base 53 this is secured to the rear surface of device D or a case or other protective device within which the device D is received. The pivot base 53 includes a mounting wall 55 that is adapted to be secured to the device D or case or other protective device, in combination with a lip 57 that extends about all or portions of the periphery of base 55. The lip 57 has a generally circular configuration and is adapted to overlie a complementary beveled edge 59 defined by pivot disk 51. With this arrangement, when first connector member 30*a* is engaged with the second connector member, shown at 40*a*, the pivot base 53 can pivot on pivot disk 51 to enable variation in the angle or orientation of device D or its case relative to support member C while connection members 30*a*, 40*a* and pivot disk 51 remain stationary. It is understood that any other satisfactory pivot arrangement may be employed between connection member 30*a* and the device D or its case such as, but not limited to, a pivot pin and opening arrangement or the like.

Figure 17:
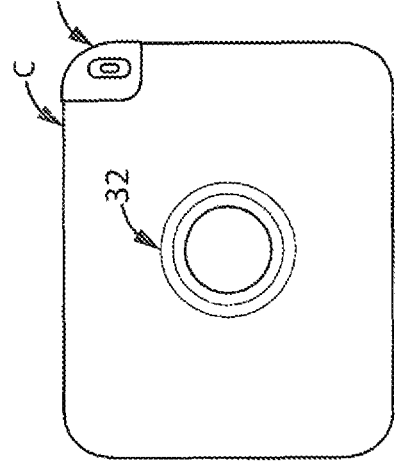
FIGS. 17-43 illustrate additional cushion-type item support concepts in accordance with the present invention.
Figure 18:
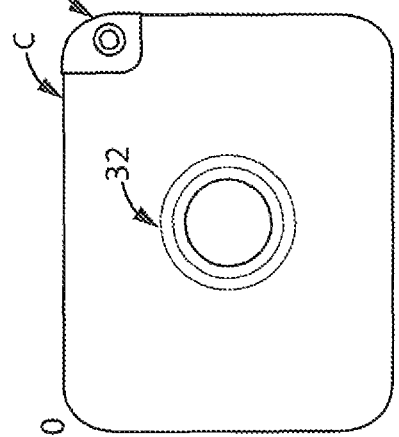
Figure 19:
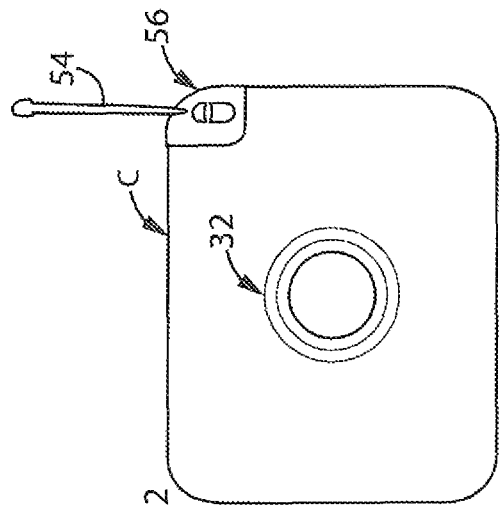
Figure 20:
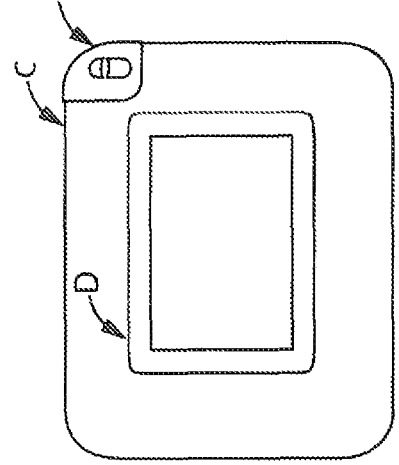
Figure 21:
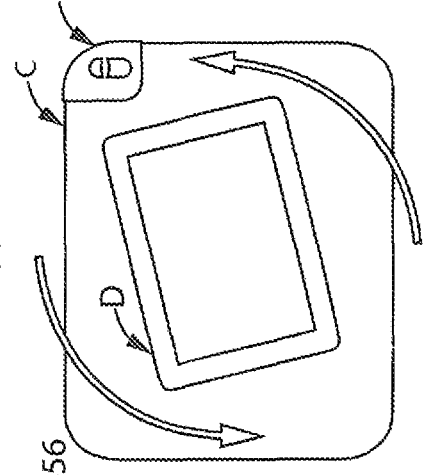
Figure 22:
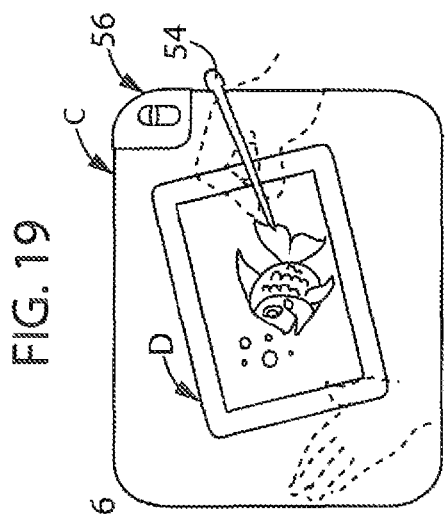

Various features may be incorporated into the support member C, as illustrated in FIGS. 17-19. FIG. 17, for example, shows a scroll dial 50 incorporated into the support member C. The scroll dial 50 is similar to that found in a typical computer mouse, and can be paired with interface device D in order to enable a user to have a scroll function for navigation, viewing documents, etc. on the interface device D. FIG. 18 shows a trackball assembly 52 incorporated into the support member C. The trackball assembly 52 is similar to that found in a typical computer mouse, and can be paired with interface device D in order to control a cursor on the screen of the interface device D or to provide other functions that can be controlled using a trackball. FIG. 19 shows a stylus 54, with a stylus receptacle 56 being incorporated into the support member C. The stylus 54 may typically be stored in the stylus receptacle 56 when not in use. In use, as shown in FIGS. 20-22, interface device D can be engaged with the support member C as described above and its position on the surface of support member C can be adjusted as desired. In this manner, when the user employs the stylus 54, for example to create an illustration on the screen of the interface device D, the interface device D can be placed in an optimal position and adjusted to other positions as necessary to provide proper ergonomic support for the user's hands and to accommodate the user's desired body position.

Figure 23:
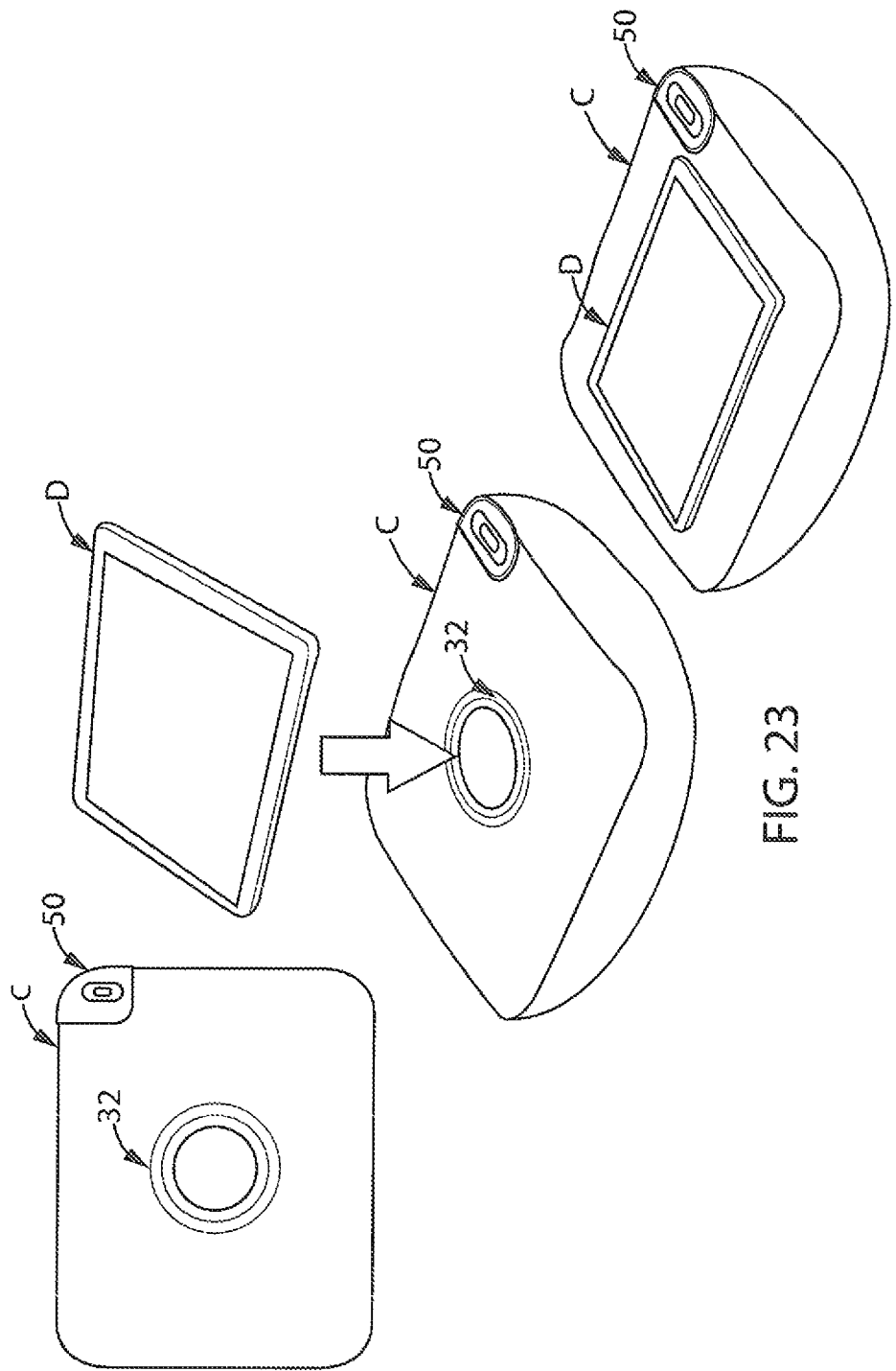

FIG. 23 illustrates an additional feature that may be incorporated into the support member C, such as when it includes a user-operated device such as the scroll dial 50, trackball assembly 52 or any other user-operated feature or device that may be incorporated into the support member C. This feature contemplates an interaction between the connection member on the interface device D and the connection member at engagement area 32 of support member C. The user-operated device, such as scroll dial 50, includes an illumination feature that is normally off when interface device D is not secured to engagement area 32 of the support member C. However, when the connection member 30, in the form of a magnetically attractive member, of the interface device D is engaged with the connection member 40, also a magnetically attractive member, of the cushion member C, such engagement functions as a magnetic switch to actuate the circuit that includes the user-operated device, such as scroll dial 50, so as to illuminate it when interface device D is supported by the support member C. It can be appreciated that the user-operated device may be powered by a battery power or alternatively the support member C may have a power cord that provides power to the user-operated device. Appropriate circuitry may be incorporated into the interior of the support member C so as to switch on the illumination feature of the user-operated device when the interface device D is engaged.

Figure 24:
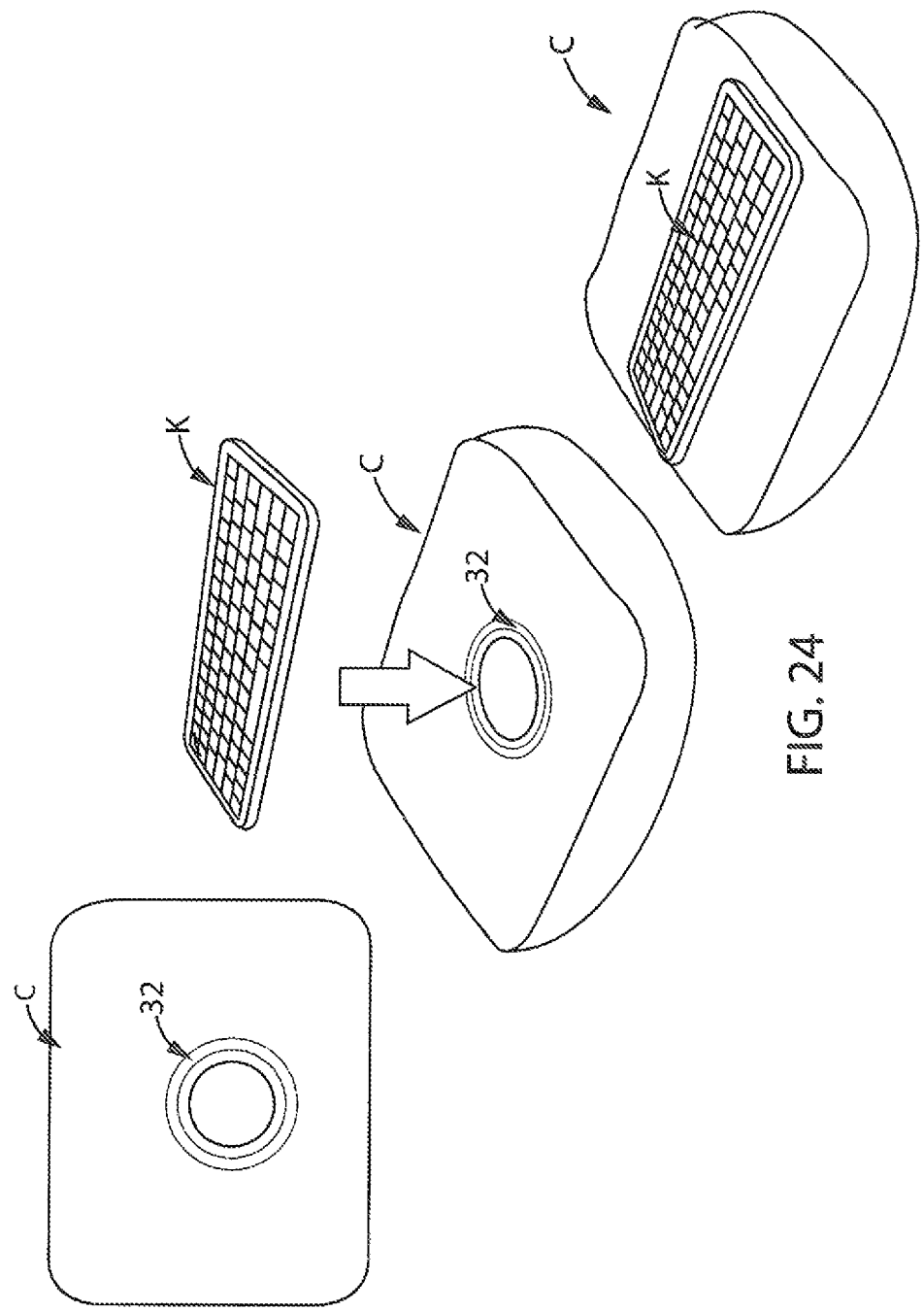

FIG. 24 illustrates an alternative type of interface device that can be supported using the support member C, in the form of a keyboard K. As described above with respect to interface device D, the first connection member 30 may be secured to the rear surface of the keyboard K in a manner similar to that shown and described with respect to FIGS. 12 and 13. As also described above, the keyboard K may have an internal component, such as the frame 38 as shown in FIG. 14, which is formed of a magnetically attractive material such that the separate connection member 30 is unnecessary. In either event, the keyboard K is magnetically secured to the upwardly facing surface of support member C and can be positioned as desired by a user to provide a comfortable support for the keyboard K, such as on the user's lap or the like. The areas of support member C around the keyboard K provide support for the user's hands. The deformability and malleability of the support member C enable the user to manipulate the material of the support member C around the keyboard K to provide a desired location and amount of support for the user's hands.

Figure 25:
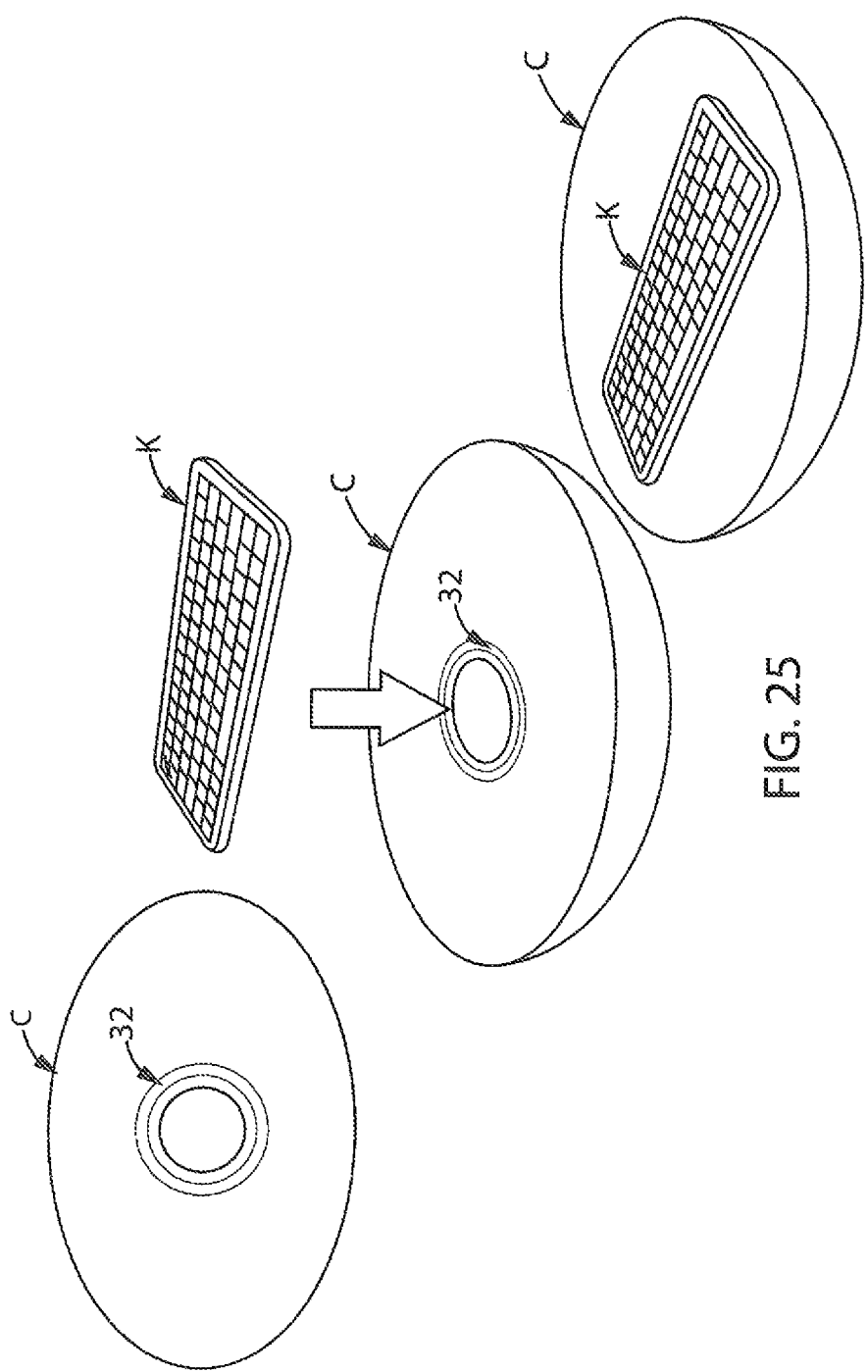

FIG. 25 simply illustrates an alternative shape of the support member C, which representatively may be oval or oblong as opposed to the more rectangular configuration of the support member C shown and described previously. The alternatively shaped support member C may be employed to support any type of interface device, including but not limited to keyboard K as illustrated.

Figure 26:
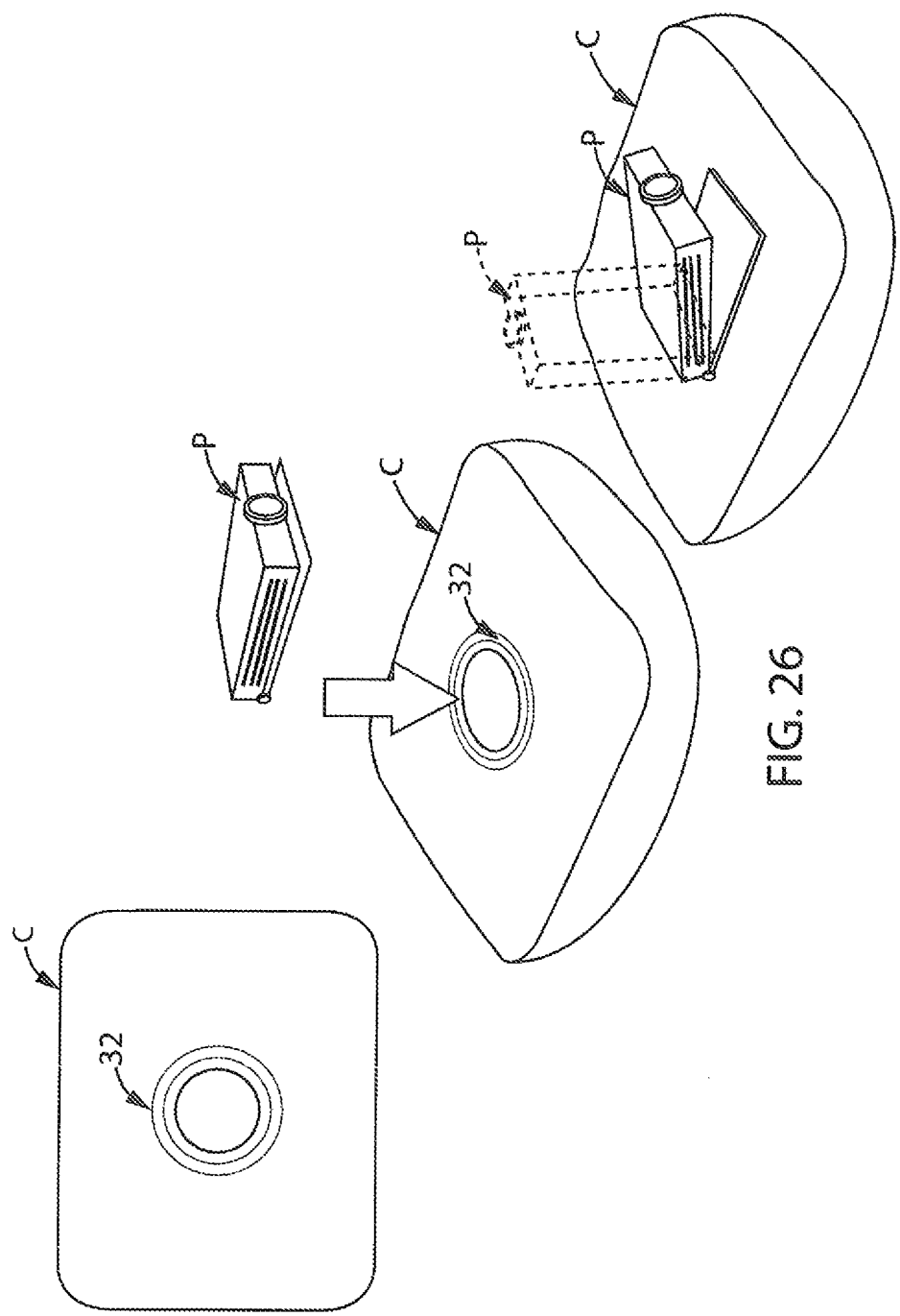

FIG. 26 illustrates an alternative type of interface device that can be supported using the support member C, in the form of a projector P. As described above with respect to interface device D and keyboard K, the first connection member 30 may be secured to the base or other downwardly facing surface of the projector P in a manner similar to that shown and described with respect to FIGS. 12 and 13. As also described above, in the event a magnetically attractive connection arrangement is employed, the projector P may have an internal component or a magnetically attractive base or portion thereof, such that a separate magnetically attractive connection member 30 is unnecessary. In either event, the projector P is secured to the upwardly facing surface of support member C and can be positioned as desired by a user to provide a desired angle or position of the projector P.

Figure 27:
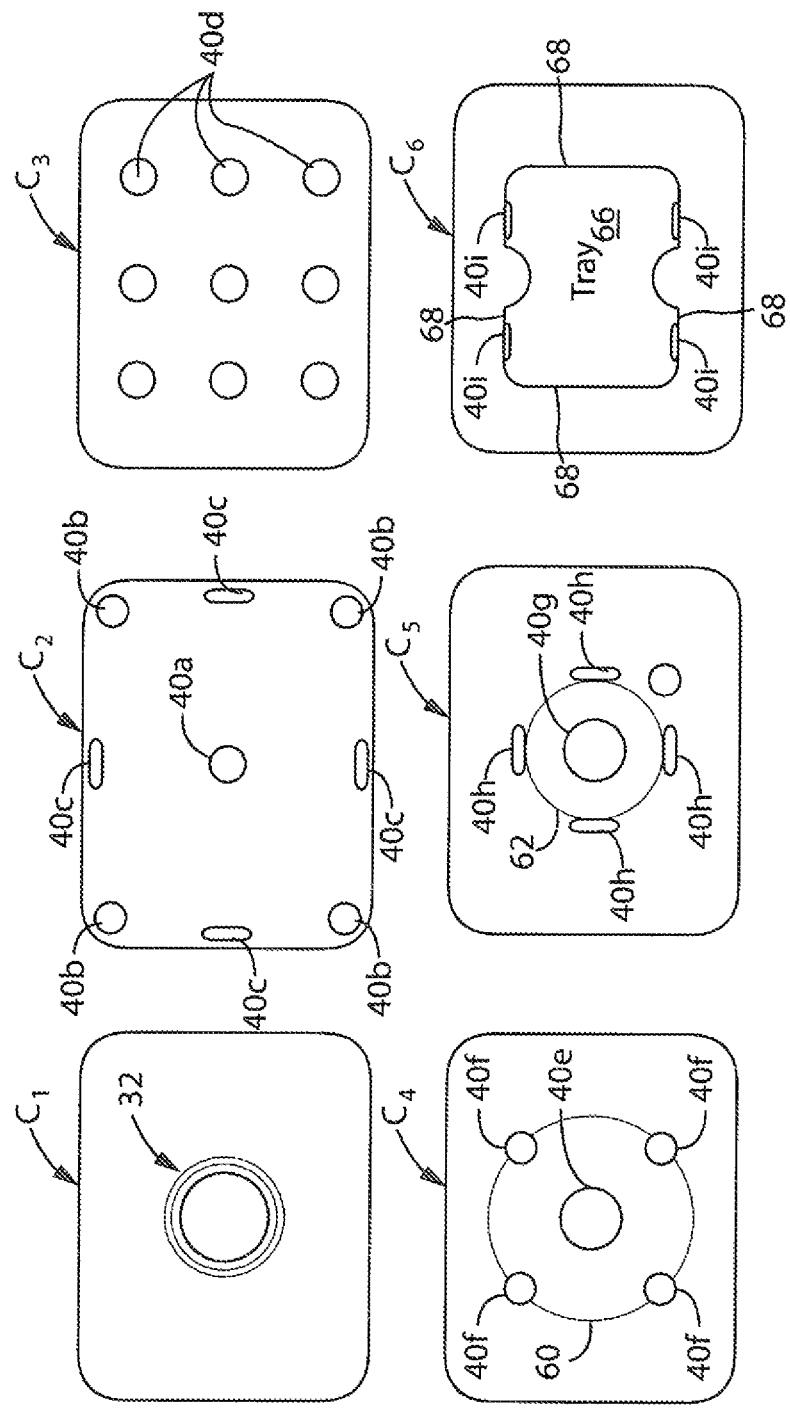

FIG. 27 illustrates different arrangements and configurations of the second engagement or connection member(s), such as 40, shown and described previously, and which may either be configured and constructed for magnetic or mechanical connection. Support member C1 has the generally central engagement area 32 with the single relatively large connection member 40, as described above. Support member C2 includes a central connection member 40*a* as well as a series of connection members 40*b*, 40*c* positioned about the periphery of support member C2. Support member C3 includes a series of connection members 40*d* that are arranged in rows and columns and are spaced inwardly from the peripheral edges of the support member C3. Support member C4 includes a support member or plate 60, which may be rigid or semi-rigid, secured to the surface of support member C4. A central connection member 40*e* is positioned at the center of support plate 60. If desired, a series of auxiliary connection members 40*f* may be positioned at the interface between the outer periphery of support plate 60 and the surrounding material of support member C4. Alternatively, the auxiliary connection members 40*f* may be on the surface of support plate 60 or on the surface of support member C4 outwardly of the outer periphery of support plate 60. Support member C5 also has a central connection member 40*g*, in combination with auxiliary connection members 40*h* that are spaced from the central connection member 40*g*. The auxiliary connection members 40*h* may be oval or oblong as shown, or may have any other shape as desired. The auxiliary connection members 40*h* may be spaced outwardly of the periphery of a rigid or semi-rigid support member, ring or plate 62, which may be covered by the material of support member C5 or alternatively may be exposed. Support member C6 includes a rigid or semi-rigid tray 64, which includes a bottom wall 66 and sidewalls 68 that extend upwardly from bottom wall 66 and define an upwardly facing recess having a configuration configured to receive the item to be supported, such as user interface device D. The tray 64 may include connection members 40*i*, which may be placed so as to cooperate with either similarly positioned exterior connection members on the item to be supported, such as user interface device D, or, in the case of a magnetic connection arrangement, alternatively may interact with internal magnets or magnetically attractive members associated with the interface device D for releasably securing the interface device D in position. The tray 64 may be pivotable relative to the support member C6 so as to enable adjustment in the orientation of the supported item, or alternatively may be fixed in position.

Figure 28:
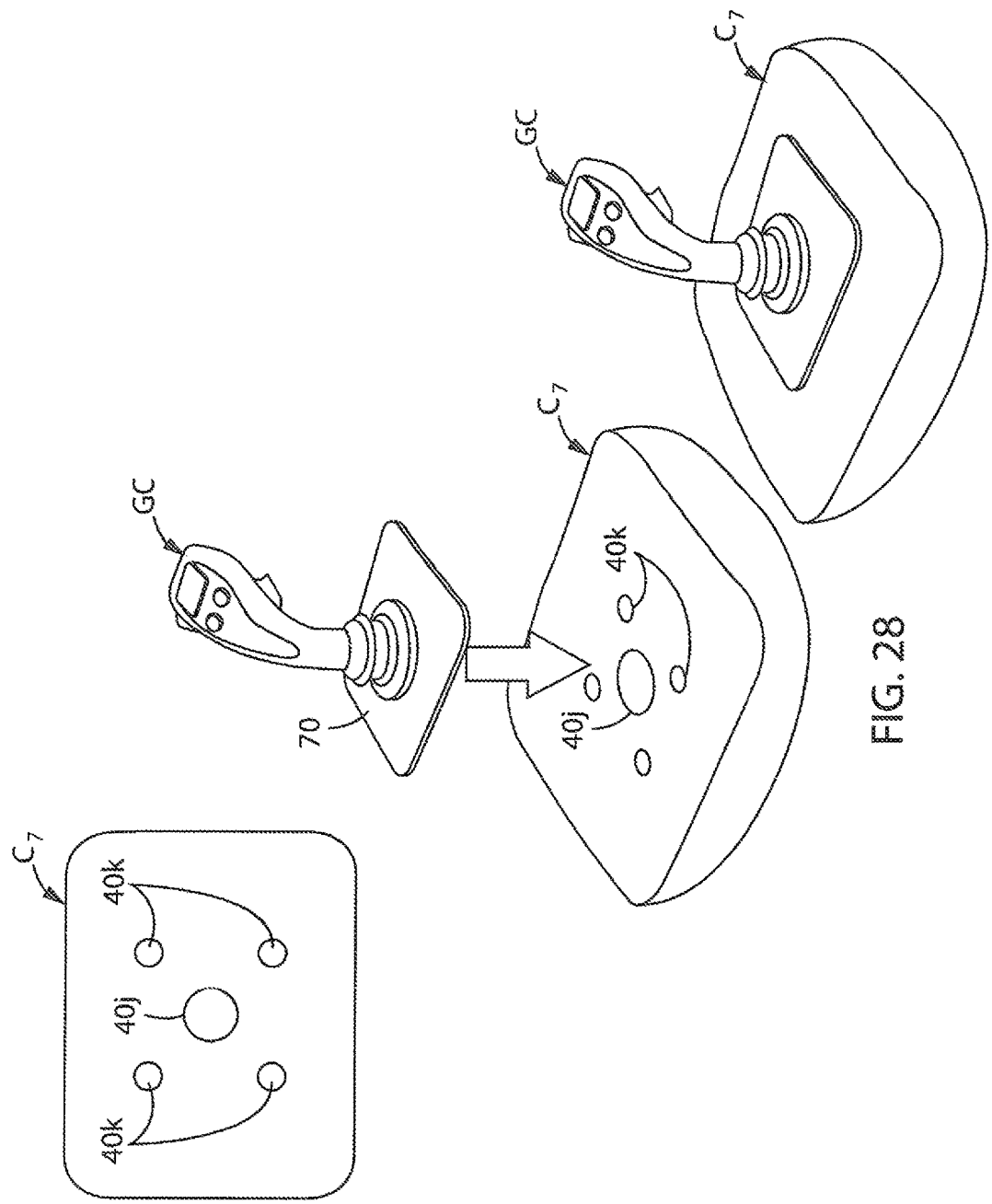

FIG. 28 illustrates a support member C7, which includes a series of connection members in the form of a central connection member 40*j* in combination with auxiliary connection members 40*k*, which may be configured and constructed for either magnetic or mechanical connection. Support member C7 is adapted for use in combination with a game controller GC, which is illustrated as a joystick-type controller but alternatively may take any other form, such as a steering wheel or the like. In the illustrated embodiment, the game controller GC includes a base 70, which has a footprint similar to that of the configuration defined by auxiliary connection members 40*k*. In the case of a magnetic connection arrangement, the base 70 may be formed of or include a magnetically attractive material, such that base 70 is magnetically releasably engaged with the upper surface of support member C7 when base 70 is placed over connection members 40*j*, 40*k*. Alternatively, magnetic or mechanical connection members may be secured to the underside of base 70 as shown and described previously.

Figure 29:
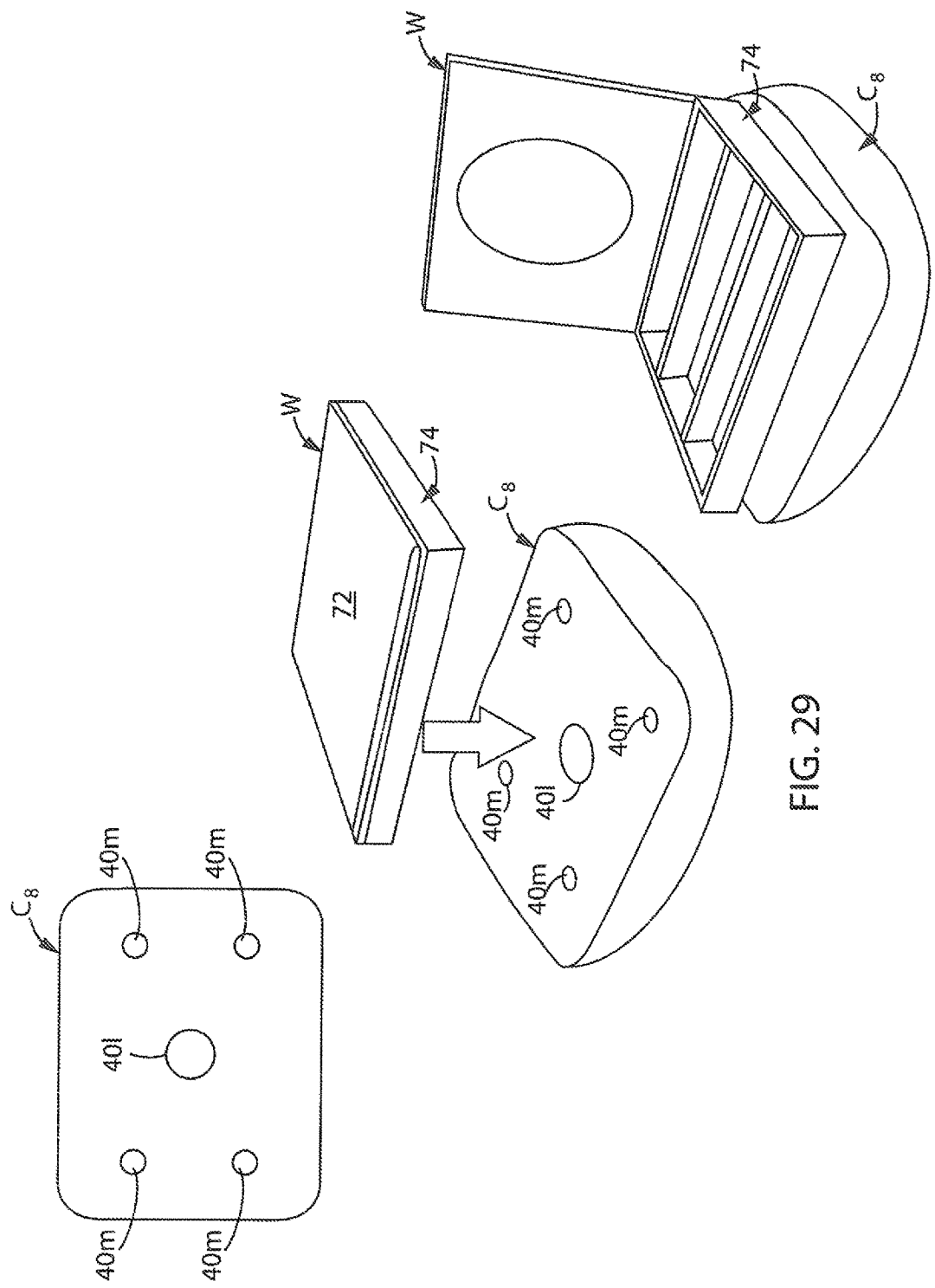

FIG. 29 illustrates an alternative item that may be supported using a cushion-type support member in accordance with the present invention, in this case support member C8. Support member C8 has an array of connection members, which representatively may include a central connection member 40*l* and auxiliary connection members 40*m* and which may either be configured and constructed for magnetic or mechanical connection. The item illustrated in FIG. 29 to be supported by the support member C8 may representatively be in the form of a workstation W, having a generally planar top wall defining a work surface 72 that may include a lower storage section 74. In the case of a magnetic connection arrangement, portions or all of the bottom wall of the work surface 72 or lower storage section 74 may be formed of or include a magnetically attractive material, such that workstation W is magnetically releasably engaged with the upper surface of support member C8 when engaged with connection members 40*l*, 40*m*. Alternatively, magnetically attractive or magnetic connection members may be secured to the underside of the bottom of work surface 72 or storage section 74 as shown and described previously. In an alternative configuration, the storage section 74 may be eliminated and the work surface 72 may be secured to the surface of support member C8 on its own. The storage section 74 is well suited for use in storing art supplies, craft supplies, cosmetics, etc. Other variations or configurations of a workstation or work surface arrangement are possible and within the scope of the present invention.

Figure 30:
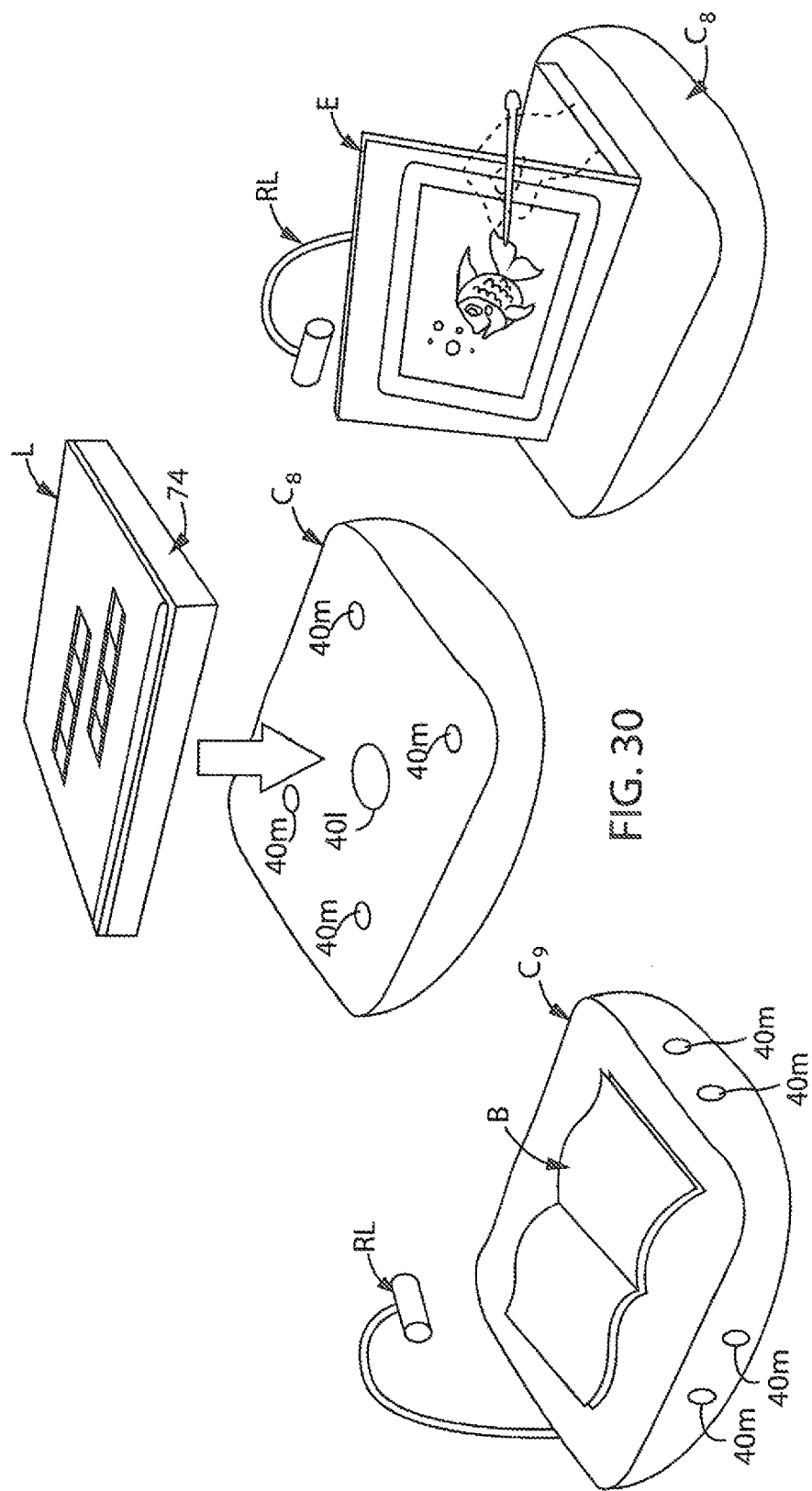

FIG. 30 illustrates alternative additional items that may be supported using a cushion-type support member in accordance with the present invention. For example, a light box L or an easel E could be engaged with the upper surface of support member C8 in the same manner as described previously with respect to workstation W. A conventional book B may also be supported on the upper surface of the support member, shown at C9. The book B may be fitted with a cover that is formed of or with a connection arrangement, such as a magnetically attractive material or a material having mechanical connection properties, which can interact with the connection members in the upper surface of support member C9 so as to secure the book B in place. In addition, peripheral items or accessories may be secured to the support member C9. Such items may include, but not be limited to, a reading light RL, which may interface with members such as shown at 40*n* that are provided on one or more side areas of support member C9. Representatively, reading light RL may have a base or housing that is formed of or includes a magnetically attractive material or a material having mechanical connection properties, or alternatively may have one or more connection members secured thereto as described previously. In this manner, the accessories such as reading light RL may be releasably secured to the support member C9.

Figure 31:
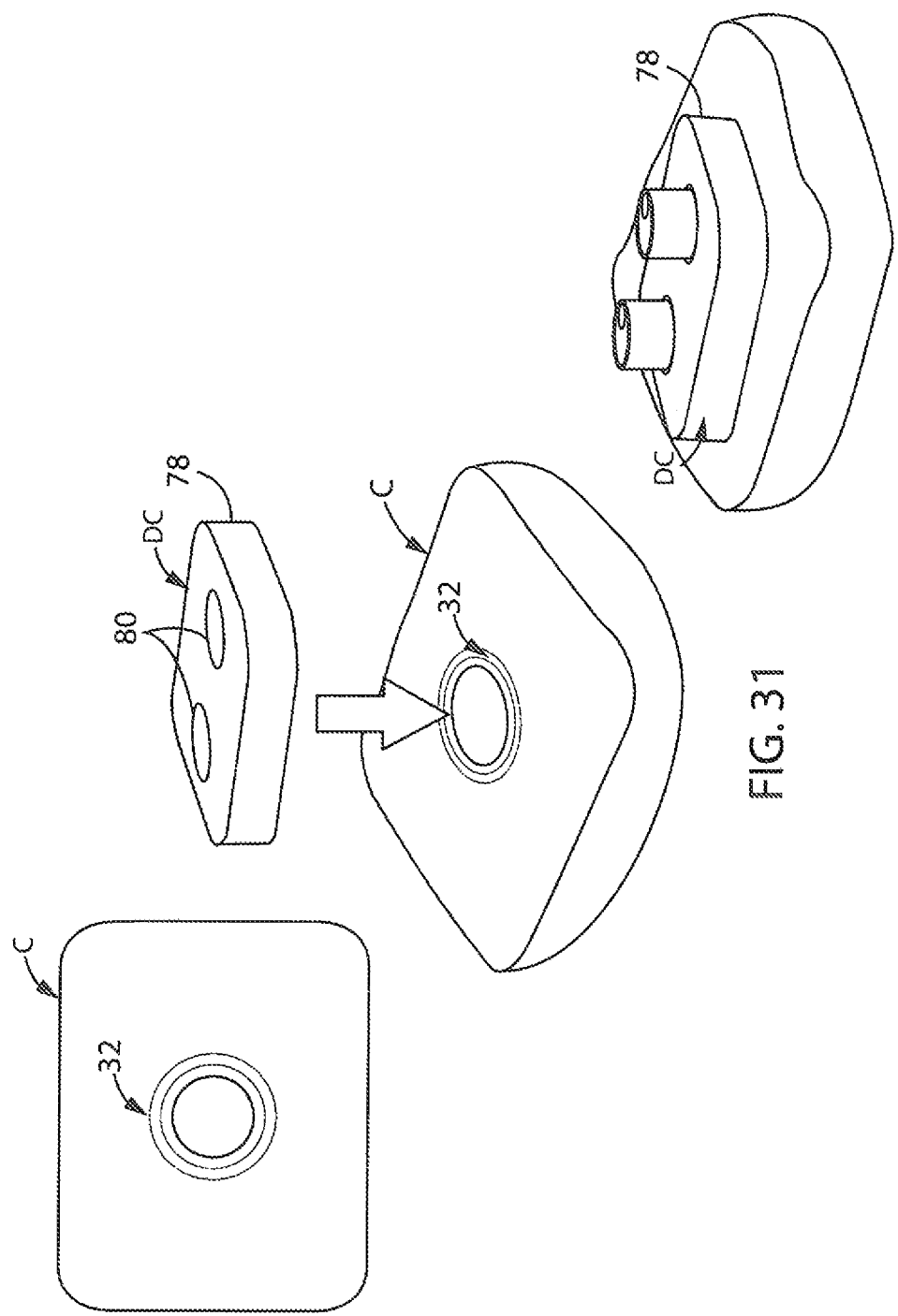

FIG. 31 illustrates another example of an item that can be supported on a cushion-type support member in accordance with the present invention. In this example, a drink caddy DC is adapted to be supported on the support member C. The drink caddy DC is in the form of a base 78 that includes one or more upwardly facing recesses 80, each of which is configured to receive a beverage container. The underside of the base 78 may be formed of or include a magnetically attractive material or a material having mechanical connection properties, such that base 78 is releasably engaged with the upper surface of support member C when drink caddy DC is placed over the connection member at engagement area 32 as described above. Alternatively, connection members may be secured to the underside of the base 78 as shown and described previously.

Figure 31A:
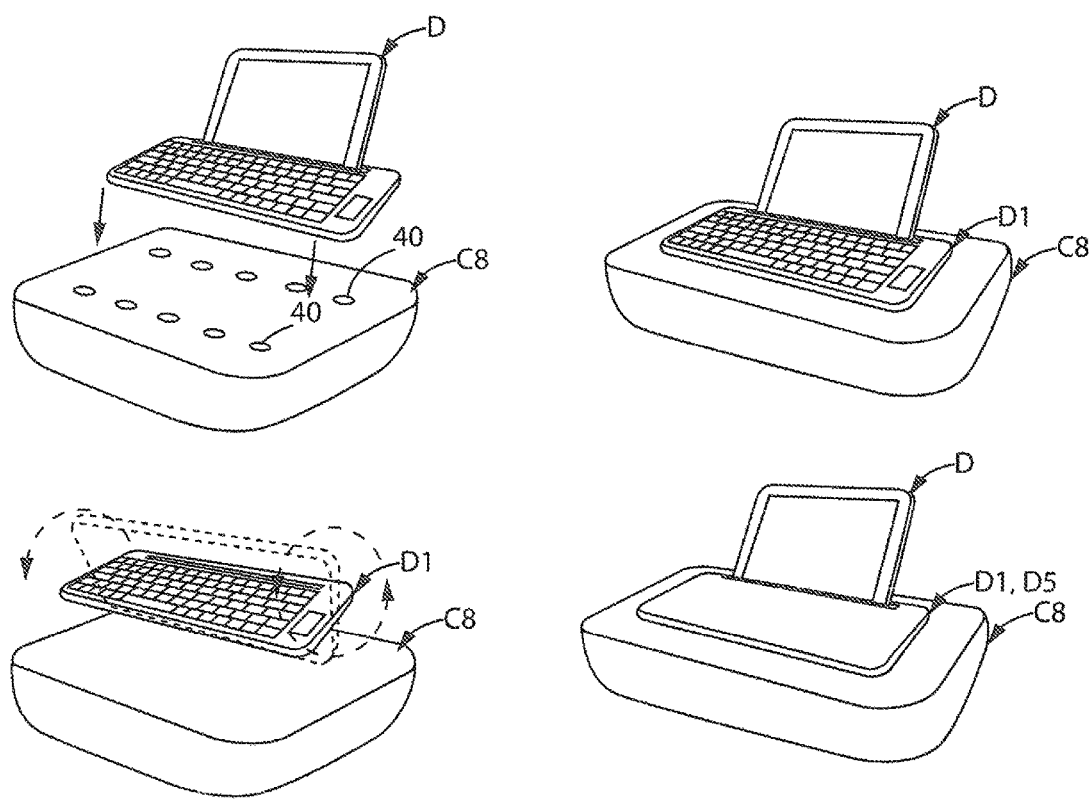
Figure 31B:
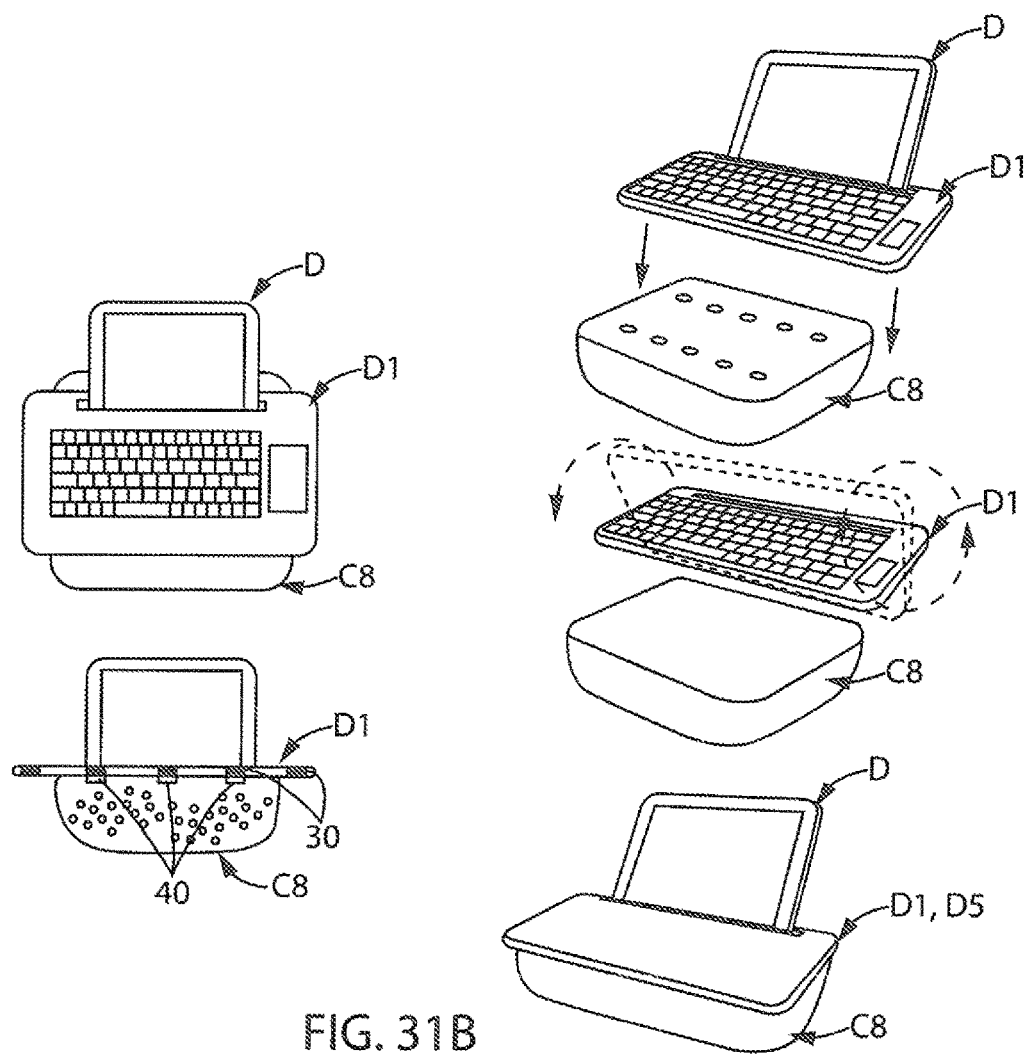
Figure 31C:
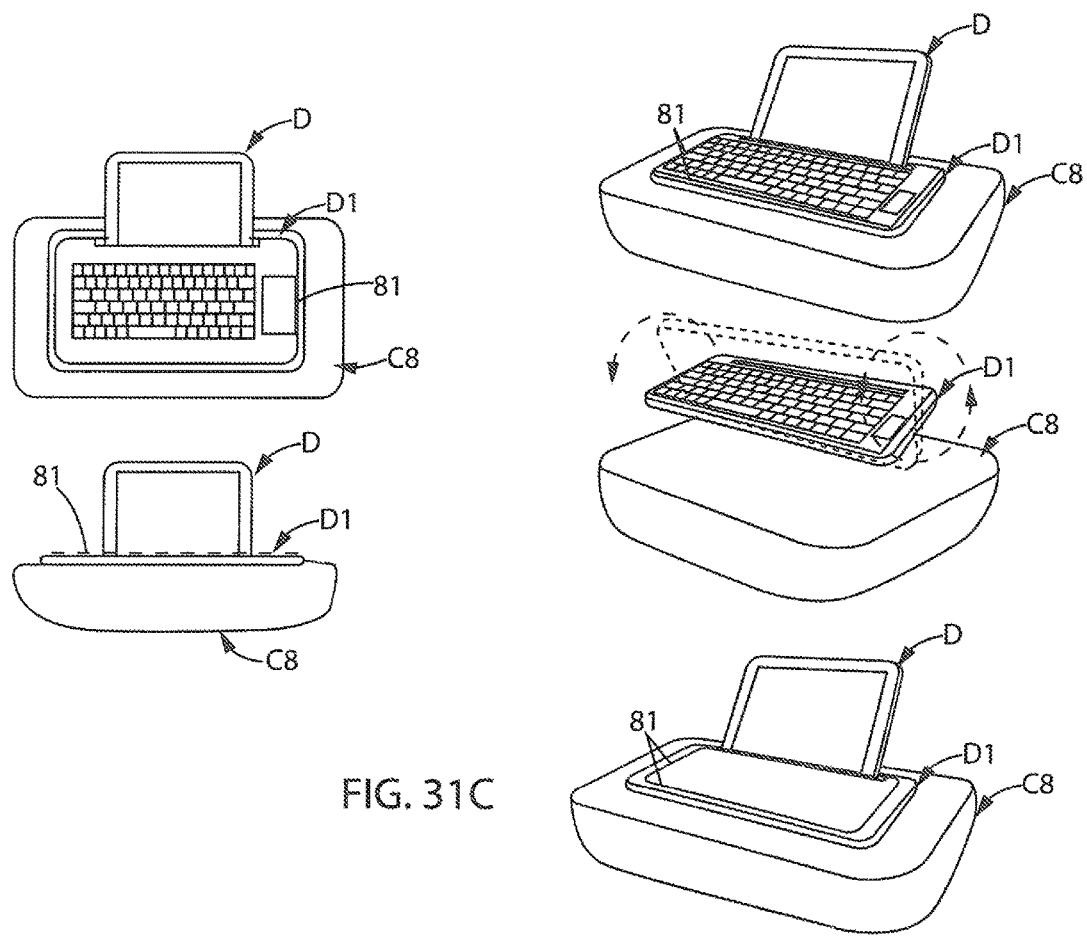
Figure 32:
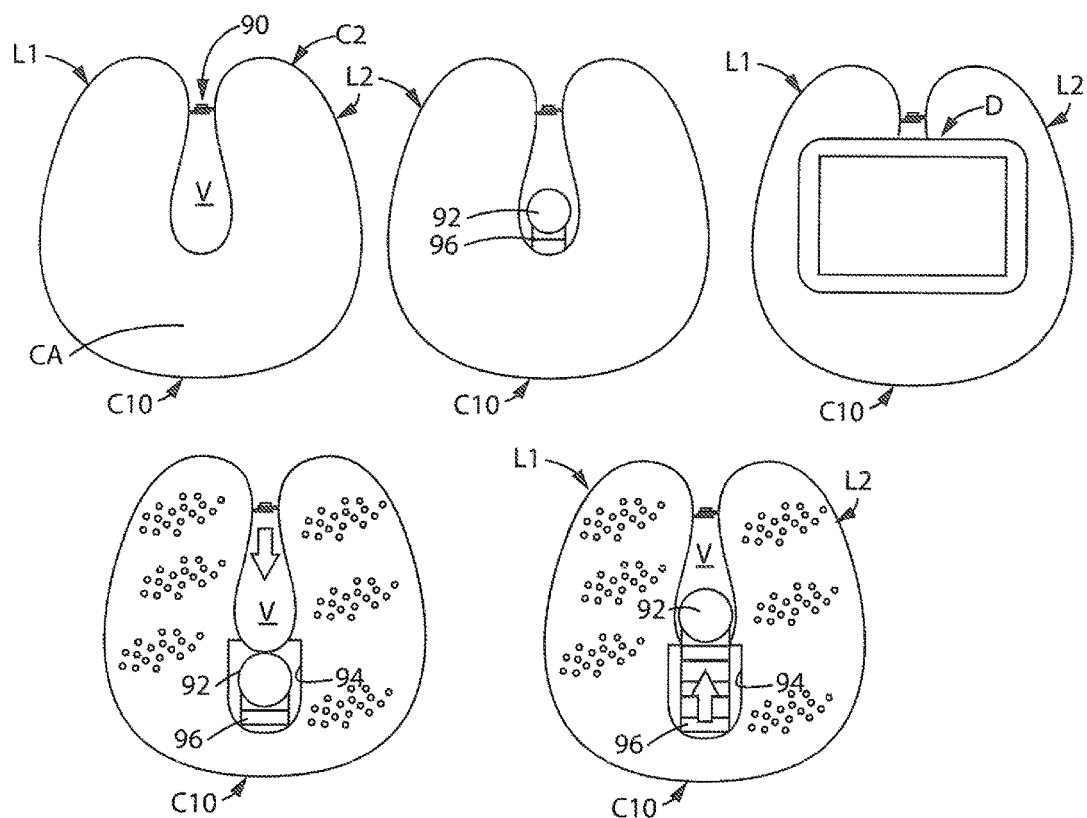

FIGS. 31A-31C illustrate additional support member concepts in accordance with the present invention. As shown in FIG. 31A, a support member such as C8 is provided with one or a series of second connection members 40, which are configured for engagement with one or a series of similarly positioned first connector members provided on the underside of an item such as an interface device D1. In the illustrated embodiment, the interface device D1 is adapted to support and/or interface with an interface device D. Again, as noted previously, the first connection members and the second connection members 40 may have either a magnetically attractive engagement feature or alternatively may have a mechanical or physical connection feature, such as a hook-and-loop fastener arrangement. When the interface device D is supported on the support member C8 as illustrated, the user may easily and comfortably operate interface device D1 wallet rests on his or her lap or other supporting surface, with interface device D being positioned at a desirable viewing angle. If desired, the interface device may be convertible as also shown in FIG. 31A, such that its key surface can be positioned so as to face downwardly and a blank rear surface face upwardly. The blank rear surface may have a slot for accommodating the interface device D. Alternatively, it is contemplated that the interface device D may simply be supported in a generally outstanding orientation by a desk surface DS that may not have a key surface on its opposite side. In an arrangement such as this, the desk surface DS is provided with the first connection members 30 on its underside and is removably engageable with the support member C8. FIG. 31B illustrates a similar configuration for supporting the devices D, D1 and/or the desk surface DS, in which the cushion member C8 has a smaller configuration and the interface device D1 or desk surface DS overhangs some or all of the cushion member C8. FIG. 31C illustrates an alternative configuration in which the interface device D1 or desk surface DS is provided with a hook-type strip 81 about some or all of its periphery, which can be releasably engageable with loop-type fabric as will later be described that is provided on the upper surface of cushion member C8. In his will FIG. 32 illustrates another form of cushion-type support member for supporting an item in accordance with the present invention. In this version, the support member, shown at C10, is generally U-shaped including a pair of legs L1, L2 that extend from and come together at a central area CA. The support member C10 is generally of the type commonly known as a neck pillow, which is frequently used for travel, lounging or other applications where neck support is desired. A void area V is defined between the legs L1, L2, which is typically where a user's neck would be located when the support member C10 is used as a neck pillow. In accordance with the present invention, the legs L1, L2 can be selectively secured together toward their outer ends using a releasable connection arrangement 90. The releasable connection arrangement 90 may take any satisfactory form, and representatively may include components carried by the legs L1, L2 that can be selectively secured together so as to prevent legs L1, L2 from being spread apart. For example, the releasable connection arrangement 90 carried by the legs L1, L2 may be in the form of mating snap or clasp sections, hook-and-loop fastener sections, magnetically engageable members, gripper members, etc. The support member C10 includes an engagement or connector member, shown at 92. The engagement or connector member 92 may be constructed and configured either as a magnetic connector member or a mechanical or physical connector member, as discussed above. Representatively, the connector member 92 can be selectively positioned in the void area V when it is desired to use support member C10 to support an item as described previously, such as an interface device D. As also described previously, the connector member 92 may be used to selectively maintain interface device D in engagement with support member C10, by selectively engaging a connector member on the rear wall of interface device D or a case or cover of interface device D or, in the case of a magnetic connection arrangement, a magnetically attractive internal component of interface device D. The interior of support member C10 is filled with cushioning material as shown and described previously with respect to support member C, such that the shape and configuration of support member C10 can be altered by the user as desired so as to support interface device D in a desired orientation, whether on a contoured, irregular surface or on a flat, regular surface. With this arrangement, the support member C10 can be used as either a conventional neck pillow when releasable connection arrangement 90 is disengaged and legs L1, L2 can be separated, or alternatively can be used to support an item such as interface device D. This convertible aspect of support member C10 can be especially useful when traveling, but may also be used in other environments and applications. The connector member 92 may be selectively movable between retracted and extended positions as shown in the bottom portion of FIG. 32. As shown, the support member C10 may be formed with a recess 94, which may extend inwardly into central area CA from void area V. The recess 94 is configured to receive connector member 92, as well as an extendable and retractable tether member 96 to which connector member 92 is secured. The tether member 96 may be folded or otherwise collapsed when in its retracted position so as to place connector member 92 within recess 94, and unfolded when in its extended position so as to position connector member 92 in void area V. Alternatively, the tether member 96 may be formed of a resilient, stretchable material. In this form, the connector member 92 is normally biased into a retracted position within recess 94. In use, the connector member 92 is pulled outwardly from recess 94 so as to be positioned within void area V. The user maintains application of an outward force on connector member 92 while it is engaged with the connection component of interface device D. Once the connector member 92 is engaged with the connection component of interface device D, such components remain engaged with each other so as to maintain magnetically attractive connector member 94 its extended position within void area V. The resiliency or elasticity of tether member 96 thus applies a force that urges interface device D against the surface of support member C10, which provides a secure engagement of interface device D with support member C10. In addition, it is understood that the single connector member 92 may be replaced with, or used in combination with, additional connector members or components secured either to the outside or inside of support member C10.

Figure 33:
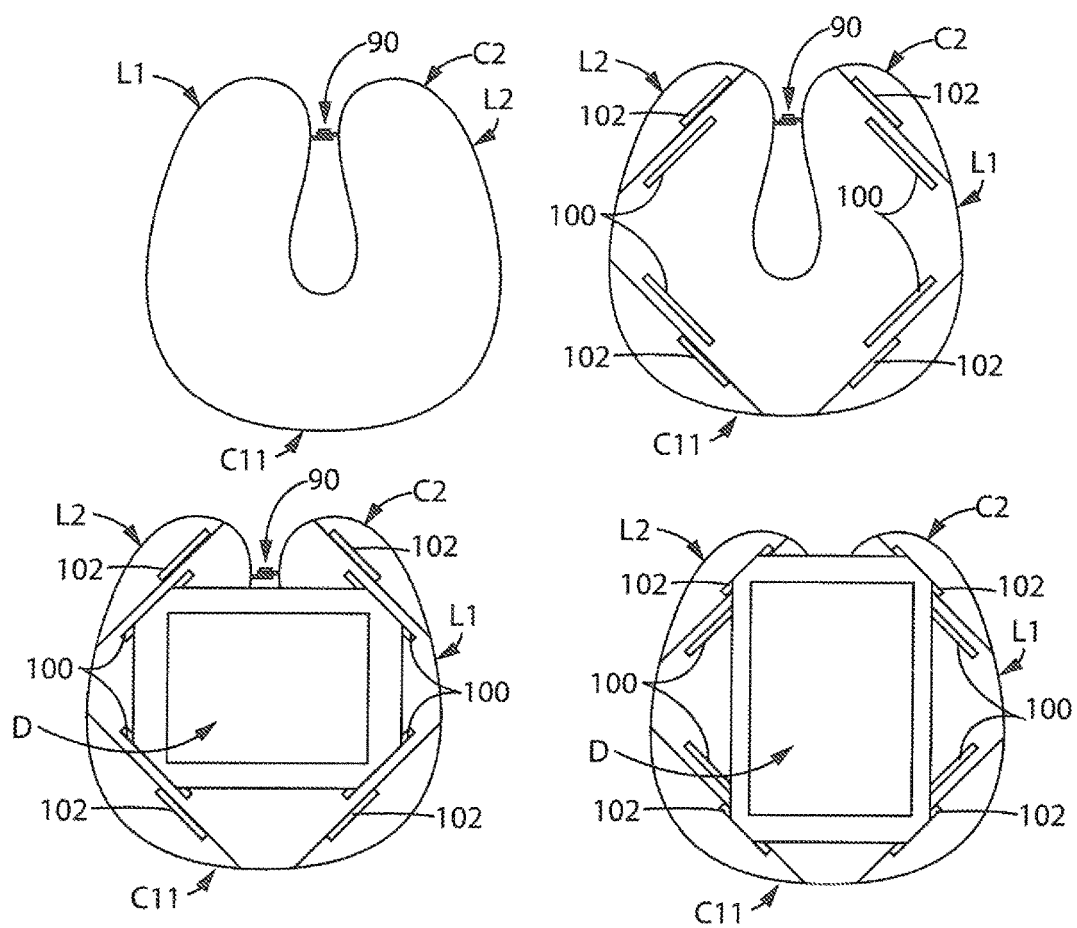

FIG. 33 illustrates an alternative engagement arrangement for securing an item, such as an interface device D, with a generally U-shaped cushion-type support member, shown at C11, similar to that shown in FIG. 32. As in the FIG. 32 embodiment, support member C11 includes legs L1, L2, which include a releasable engagement arrangement 90 as described previously. At least one side of the support member C11, such as the backside, is configured to provide engagement with interface device D so that it can be supported using support member C11. In the illustrated embodiment, engagement of the interface device D is provided by a series of slits or slots, each of which defines a pocket within which a corner of the interface device D can be engaged. Representatively, there may be an inner set of slots 100, which are sized and configured so as to define pockets that receive the corners of the interface device D when in a landscape orientation. There also may be an outer set of slots 102, which are sized and configured so as to define pockets that receive the corners of the interface device D when in a portrait orientation. As described above, in either orientation, the shape and configuration of the support member C11 can be manipulated and adjusted as desired so as to place interface device D in a desired angle or orientation when support member C10 is placed on a surface, whether it be a contoured, irregular surface or a flat, regular surface.

Figure 34:
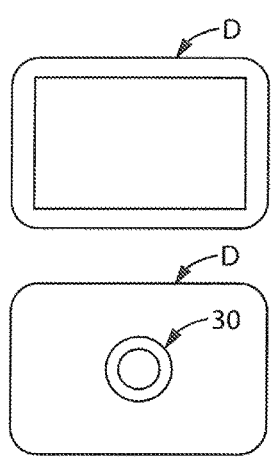

FIG. 34 illustrates an alternative engagement arrangement for securing an item, such as an interface device D, with a generally U-shaped cushion-type support member, shown at C12, similar to that shown in FIGS. 32 and 33. As in the FIGS. 32 and 33 embodiments, support member C12 includes legs L1, L2, which include a releasable engagement arrangement 90 as described previously. In this embodiment, interface device D is provided with a first connection member 30 on its rear surface, as shown and described previously, or alternatively may have an internal magnetically attractive component in the case of a magnetic engagement arrangement. Support member C12 includes a second connection member 40. In this embodiment, the second connection member 40 is positioned directly on the base or body of support member C12 at a location spaced from legs L1, L2. As noted previously, the first and second connection members 30, 40, respectively, may be magnetically attractive or alternatively may have a mechanical or physical connection arrangement, such as a hook-and-loop fastener arrangement. In addition, the support member C12 may be provided with an inductive charging arrangement for device D, for example, the second connection member 40 may have an inductive charging plate 110. Alternatively, the inductive charging component may be provided on support member C12 at a location other than at the location of second connection member 40. The inductive charging component, such as inductive charging plate 110, may be powered by a battery bank or charger contained within the interior of support member C12. In the case of a charger, support member C12 may include a charging port by which power can be supplied to the internal charger for recharging. With this arrangement, when device D is capable of being inductively charged, the battery of the device D can be charged while the device D is in use and whenever it is engaged with the support member C12. It should be understood that, while the inductive charging feature is shown and described in connection with support member C12, any of the previously-described support members as illustrated in FIGS. 1-33, or those described hereafter, may also be provided with an inductive charging feature.

Figure 35:
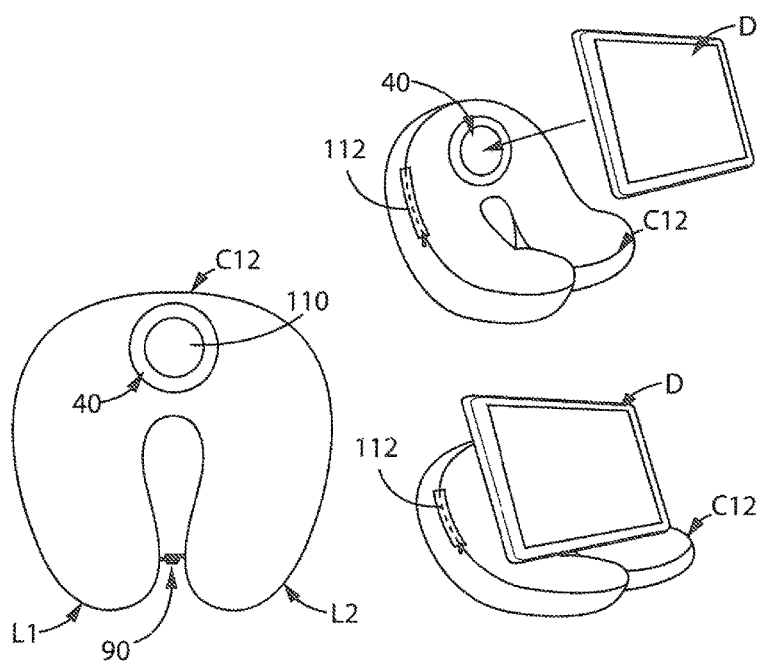

FIG. 35 illustrates support member C12 with device D engaged and supported for use. As also shown in FIG. 35, the support member C12 may include an internal pocket that can be accessed through an opening having a closure, such as a zipper 112. The internal pocket may be configured to house a battery bank or charger for inductive charging purposes, as described above, and/or may also be used to house or contain earphones, speakers, a haptic driver, etc.

Figure 36:
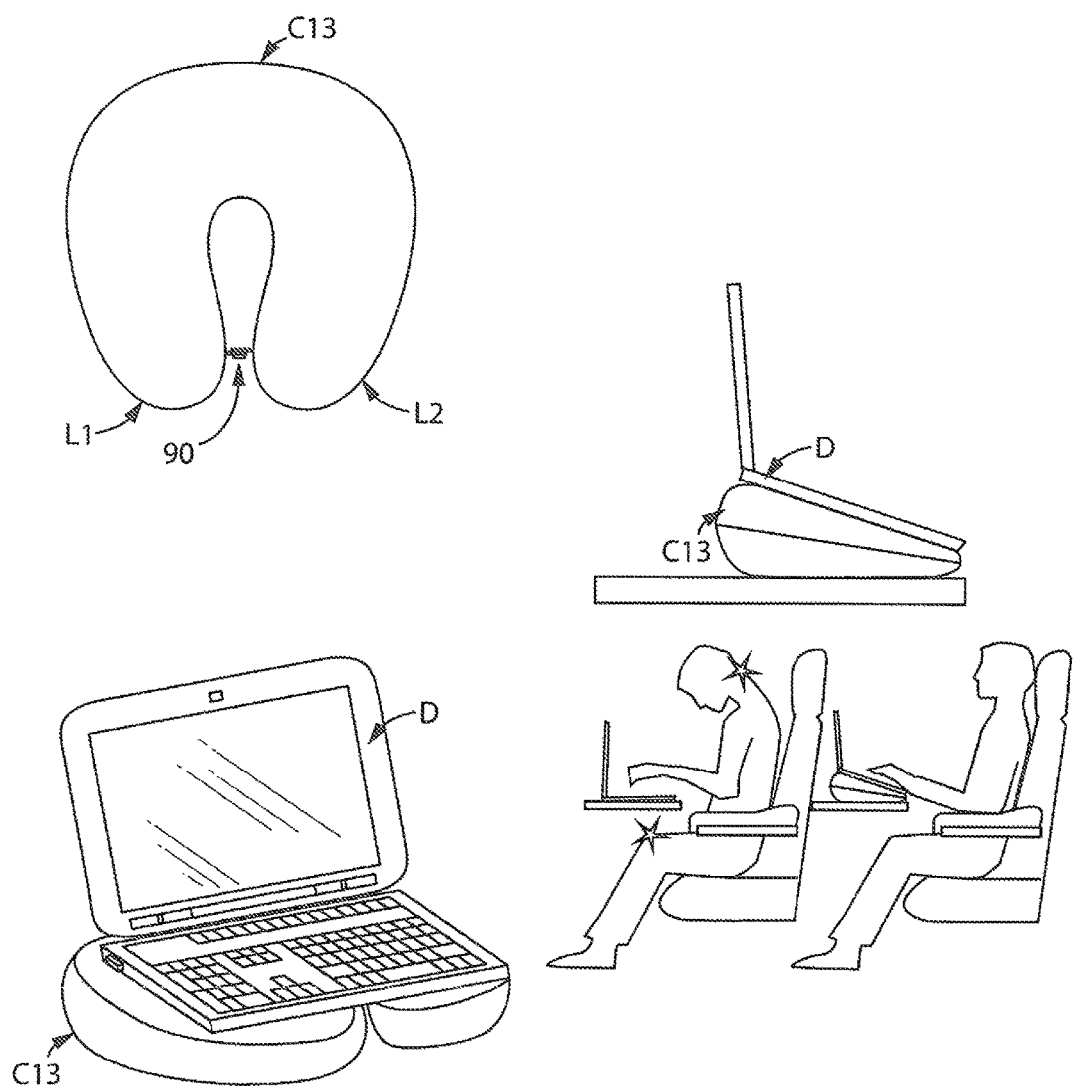

FIG. 36 illustrates an alternative engagement arrangement for securing an item, such as an interface device D in the form of a laptop or notebook computer, with a generally U-shaped cushion-type support member, shown at C13, similar to that shown in FIGS. 32-35. As in the FIGS. 32-35 embodiments, support member C13 includes legs L1, L2, which include a releasable engagement arrangement 90 as described previously. In this embodiment, the device-supporting portion of support member C13 may be formed of a connective material, as described previously, such as a stretchable spandex material combined with loop-type receptor fibers. The lower portion of support member C13 may be formed of any satisfactory material, such as a spandex material. In this version, one or more hook-type connectors are provided on the base of device D and are engageable with the loop-type receptor fibers on the supporting surface of support member C13, as described above. FIG. 36 contains an illustration showing the advantages that can be obtained using a device support arrangement such as support member C13 in use, in that a user can significantly improve his or her posture when using the device D when seated. As an alternative to the hook-and-loop connection arrangement as described, it is also understood that a magnetic connection arrangement may be employed as well as separate hook-and-loop fasteners on the support member C13 and the surface of device D.

Figure 37:
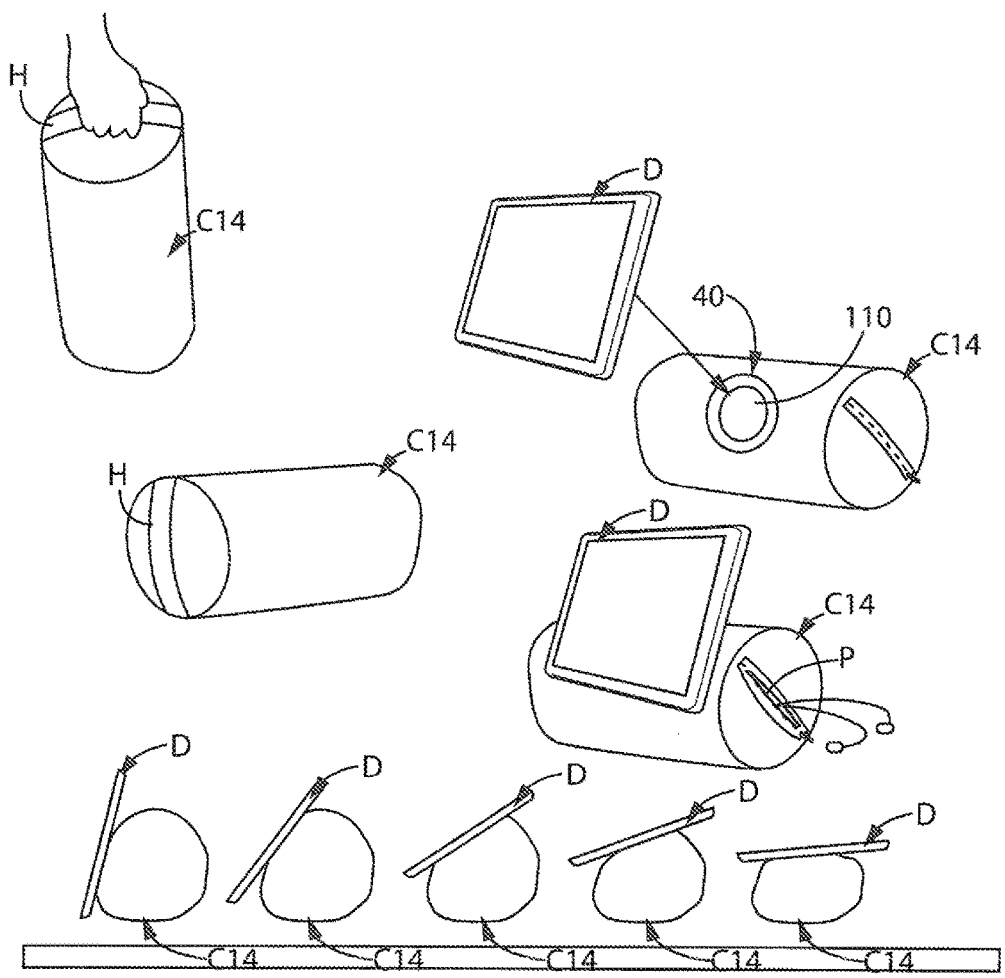
Figure 38:
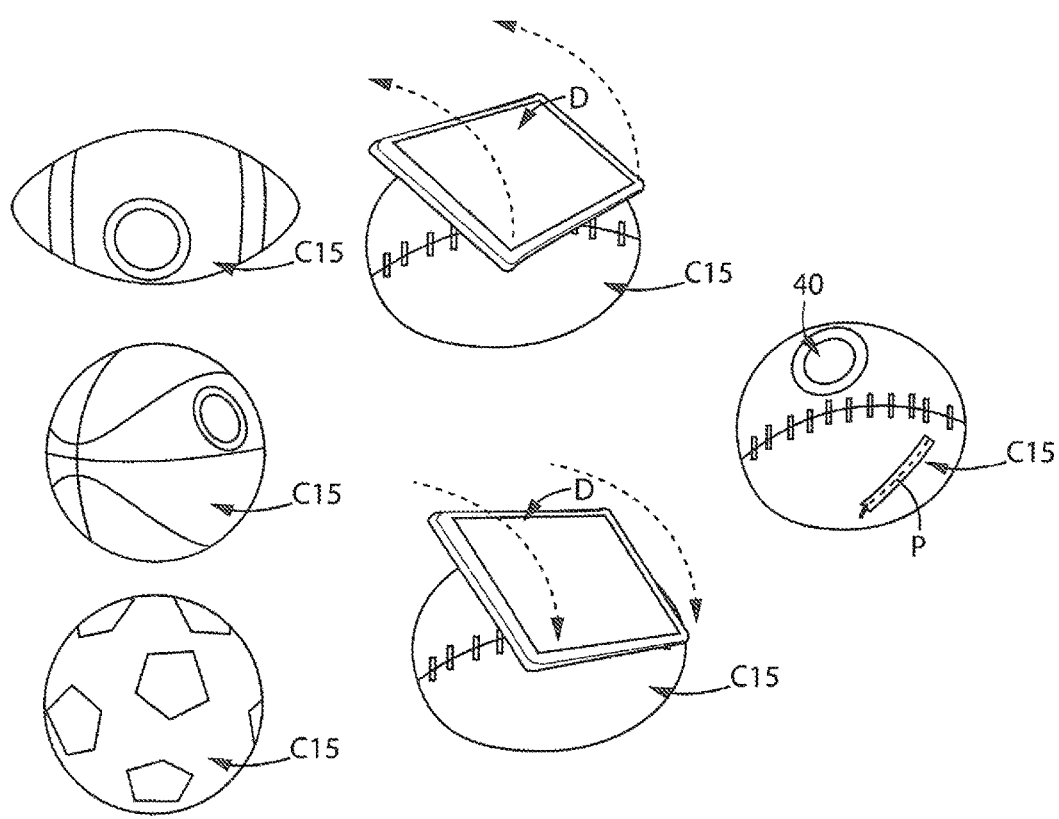
Figure 39:
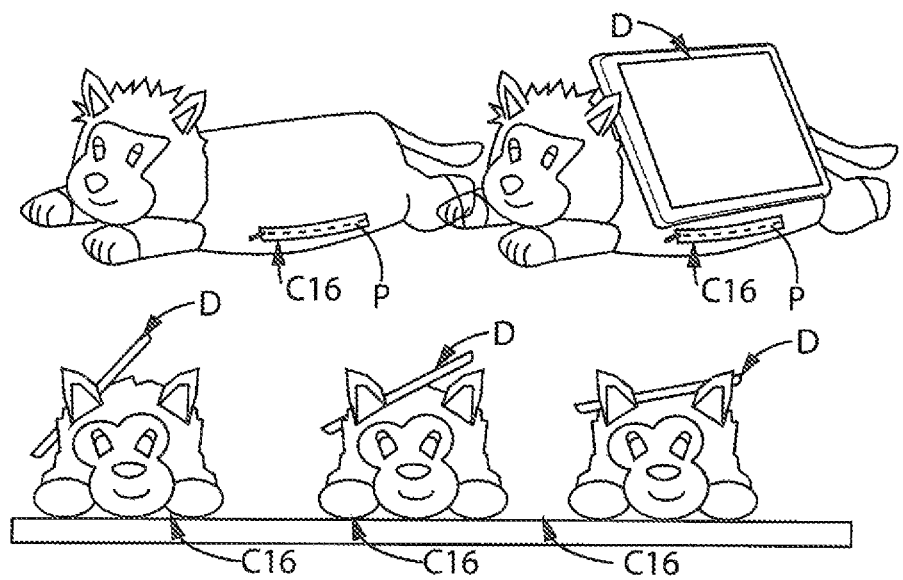

FIGS. 37, 38 and 39 illustrate other forms of a support member in accordance with the present invention. FIG. 37 illustrates a roll-type support member C14, which may be provided with a handle H and an internal pocket P having a zipper or other closure that can be used to store or house accessories or components, as described above. This version shows second connection member 40 and an inductive charging plate 110 as shown and described previously. It is understood, however, that support member C14 and device D may be provided with any of the magnetic or non-magnetic connection arrangements as shown and described previously. FIG. 38 illustrates a ball-type support member C15, which may be provided with an internal pocket having a zipper or other closure that can be used to store or house accessories or components, as described above. This version shows second connection member 40 and an inductive charging plate 110 as shown and described previously. Again, however, it is understood that support member C15 and device D may be provided with any of the magnetic or non-magnetic connection arrangements as shown and described above. As shown in FIG. 38, the ball-type support member C15 may have any form as desired, including but not limited to a spherical configuration such as is representative of a baseball, soccer ball or basketball, or an oblong configuration such as is representative of a football or the like. It can be appreciated that numerous other configurations are possible. FIG. 39 illustrates a figure-type support member C16, which again may be provided with an internal pocket having a zipper or other closure that can be used to store or house accessories or components, as described above. This version shows the connection arrangement of the support member C16 as the loop-type fabric as shown and described previously, which may be a spandex material combined with loop-type receptor fibers, as will later be explained. The device D may be provided with one or more hook-type connection members on its rear surface that are engageable with the material of the body of support member C16. Again, however, support member C16 and device D may be provided with any of the magnetic or non-magnetic connection arrangements as shown and described above. The figure-type support member C16 may have an animal shape as illustrated, or may have any other shape or configuration as desired.

In the embodiments illustrated in FIGS. 37-39, the area of the support member that underlies the device D may occupy less than the entire footprint of the device D. However, the conformable lower surface of the support member and the stretchability and flexibility of the fabric enables the device D to be placed in any desired position. Furthermore, with the loop-type fabric forming one of the surfaces of the support member, the device D can the engaged with the support member at any satisfactory or desired location for altering the angle of support, such as is illustrated in FIG. 39.

Figure 40:
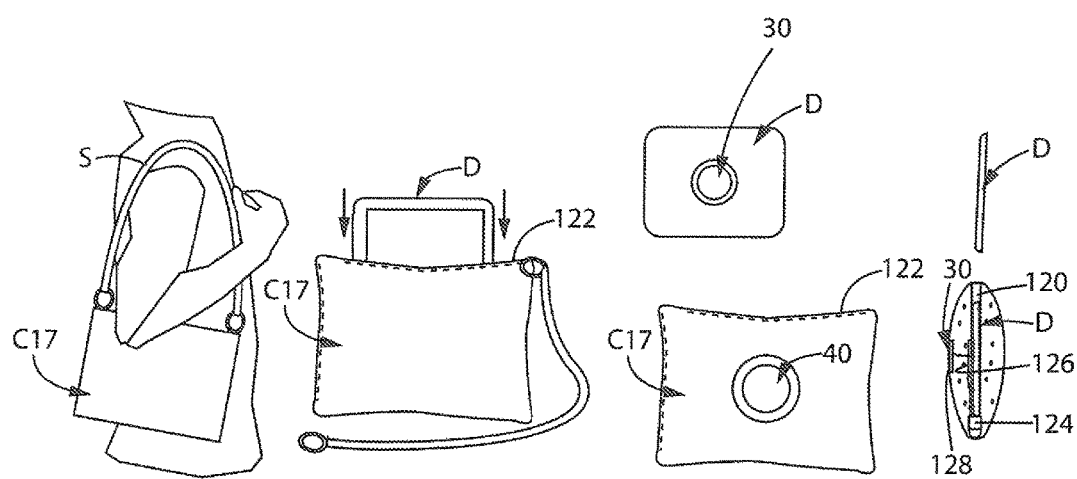

FIG. 40 illustrates a cushion-type support member C17 in accordance with another embodiment of the present invention. In this embodiment, the support member C17 is in the form of a satchel, purse, shoulder bag or handbag, which may include an optional strap S. In this version, the support member C17 is provided with an internal cavity or slot 120 which is configured to receive the device D, the cavity or slot 120 may be expandable and may have interior pockets for accessories. If desired, a closure, such as a zipper 122, may be used to releasably secure the device D within the slot 120. The slot 120 is formed such that the bottom and side edges of the device D are protected by the cushion material of support member C17 about its edges. The first connection member 30, which is carried by or secured to device D, is selectively engageable with the second connection member 40 which is provided on or carried by one of the walls of support member C17. Again, as noted previously, the connection members 30, 40 may be constructed and configured to provide either a magnetic or a non-magnetic mechanical engagement of the device D with the support member C17 during use of the device D. As also shown, the support member C17 may include an internal battery, powerpack or other power source, shown at 124, which can be connected to an internal charging plate 126 and/or an external charging plate 128. The internal charging plate 126 enables the device D to be charged during storage and transport, while the external charging plate 128 enables the device D to be charged during use.

Figure 41:
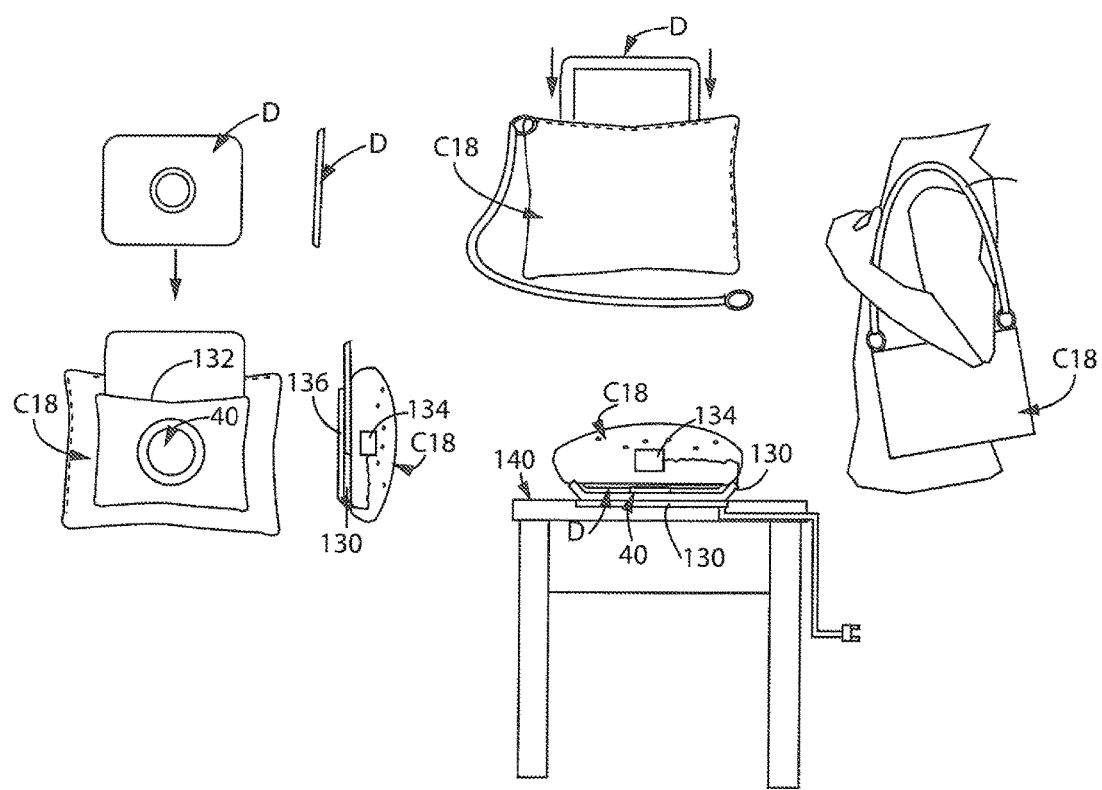

FIG. 41 illustrates a somewhat similar embodiment in the form of a support member C18 that may be in the form of a satchel, purse, shoulder bag or handbag that may include an optional strap S. In this version, the support member C18 includes a pocket 130 that is configured to receive the device D, the pocket 130 may be provided with a closure such as a zipper 132, if desired. Second connection member 40 is provided on an external wall 134 that forms the pocket 130. If desired, the support member C18 may have an internal powerpack or battery 134 that is connected to a charging plate 136 that may be adapted to provide an inductive charge to device D when stored in the pocket 130 and/or when engaged with the second connection member 40 on the exterior of the support member C18. In addition, the support member C18 may have an interior cavity with optional pockets, with an optional closure to selectively open and close the internal cavity. In this version, the charging plate 136 may be employed when the support member C18 is itself placed on an inductive charging pad, such as a charging pad 138 associated with a table, desk or the like, shown at 140, two restore the battery or powerpack 134 and/or to simultaneously charge the device D.

Figure 42:
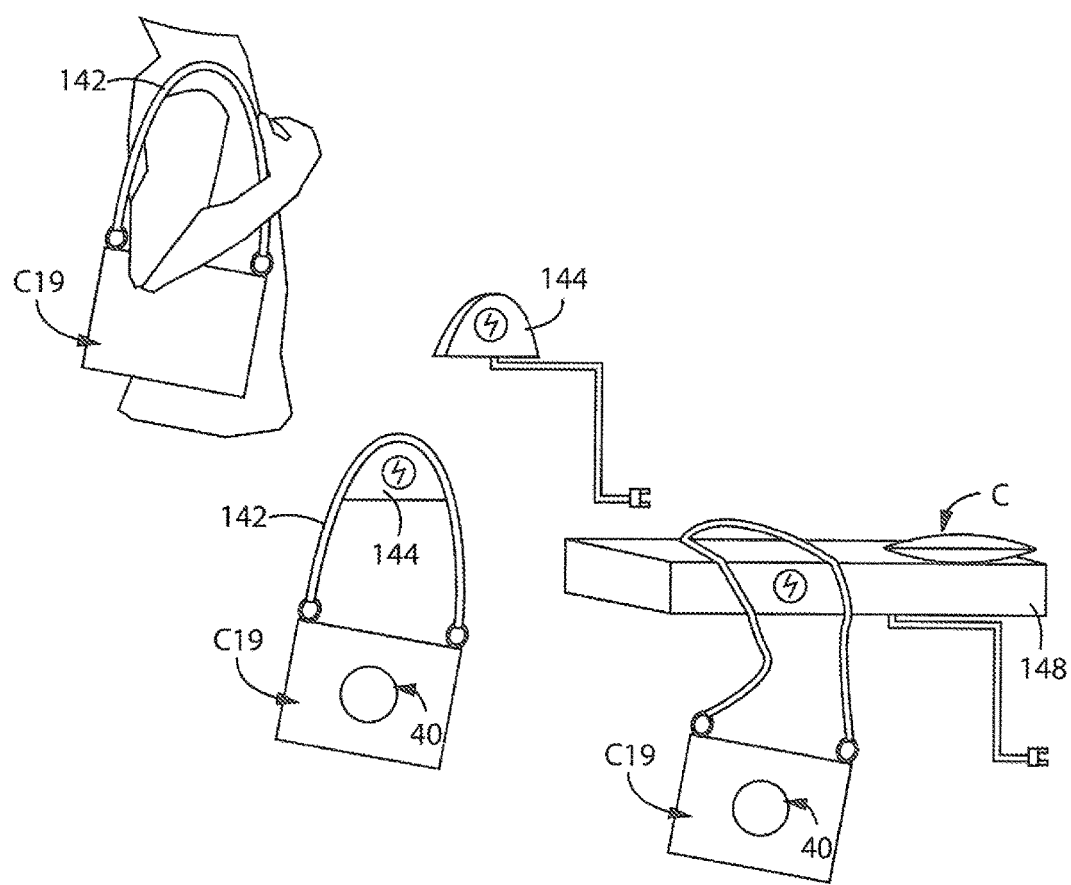

FIG. 42 illustrates a support member C19 that is somewhat similar to the version shown in FIGS. 40 and 41, and that also is in the form of a satchel, purse, shoulder bag or handbag. In this version, the support member C19 includes a strap 142 that is interconnected with a battery or powerpack contained within support member C19 to inductively charge the device D when it is engaged with second connection member 40. The strap 142 itself has an inductive component, such that when it is engaged with a charging hook 144 or a charging area 146, such as associated with a shelf or other item of furniture, power is supplied through the strap 142 to the internal battery or powerpack and the inductive charging plate so as to recharge the battery or powerpack and at the same time charge the device D when at rest and contained within the interior of support member C19. The shelf or item of furniture may also have an inductive charging area, such as shown at 148, for inductively charging the internal battery or powerpack of a support member C and/or a device D contained therewithin.

Figure 43:
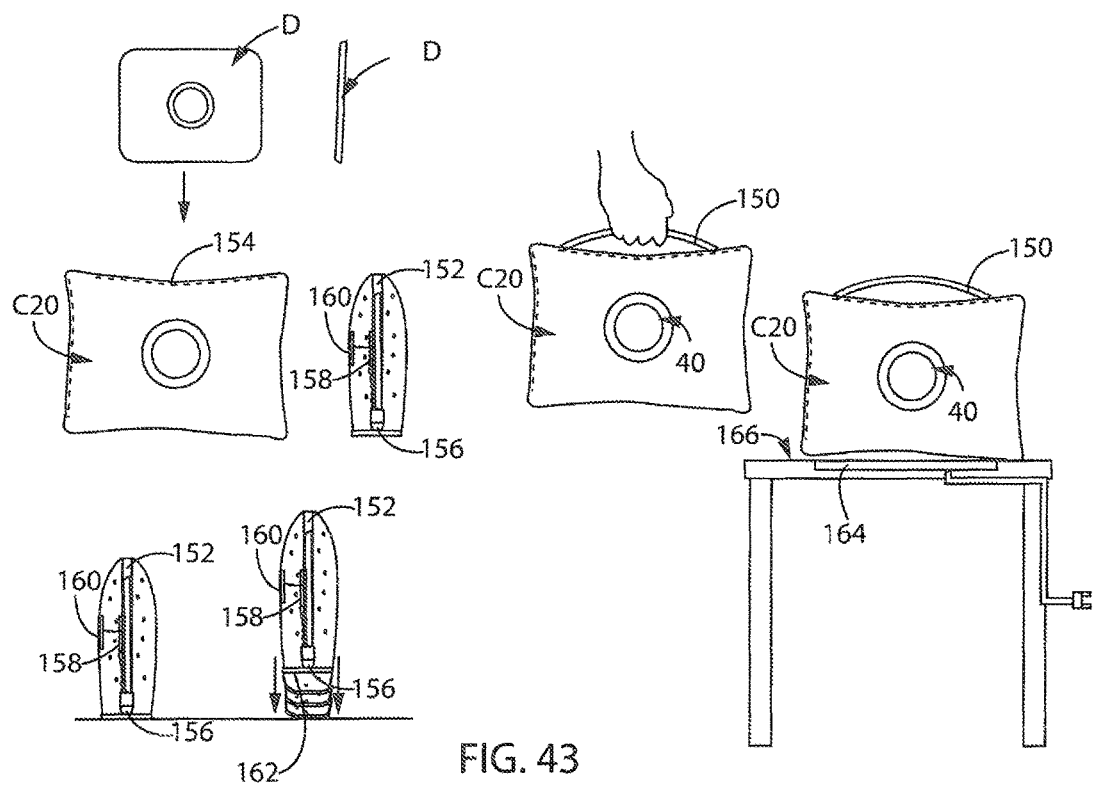

FIG. 43 illustrates a support member C20 in accordance with the present invention, which is somewhat similar in construction to support member C17 as shown and described with respect to FIG. 40. The support member C20 may have an optional strap 150 for carrying, and is provided with an internal cavity or slot 152 which is configured to receive the device D. The cavity or slot 152 may be expandable and may have interior pockets for accessories. If desired, a closure, such as a zipper 154, may be used to releasably secure the device D within the slot 152. The slot 152 is formed such that the bottom and side edges of the device D are protected by the cushion material of support member C20 about its edges. The first connection member 30, which is carried by or secured to device D, is selectively engageable with the second connection member 40 which is provided on or carried by one of the walls of support member C20. Again, as noted previously, the connection members 30, 40 may be constructed and configured to provide either a magnetic or a non-magnetic mechanical engagement of the device D with the support member C20 during use of the device D. As also shown, the support member C17 may include an internal battery, powerpack or other power source, shown at 156, which can be connected to an internal charging plate 158 and/or an external charging plate 160. The internal charging plate 158 enables the device D to be charged during storage and transport, while the external charging plate 160 enables the device D to be charged during use. In this version, an external inductive plate 162, which may have a flexible or jointed construction, is provided along at least a portion of one of the edges of the support member C20, such as along its bottom edge. The inductive plate 162 is connected with the battery bank or powerpack 156, to enable the battery bank or powerpack 156 to be recharged when the inductive plate 162 rests on an inductive charging surface, such as a charging surface 164 associated with a support surface such as is provided by a table, shelf or other article of furniture, shown at 166.

Figure 44:
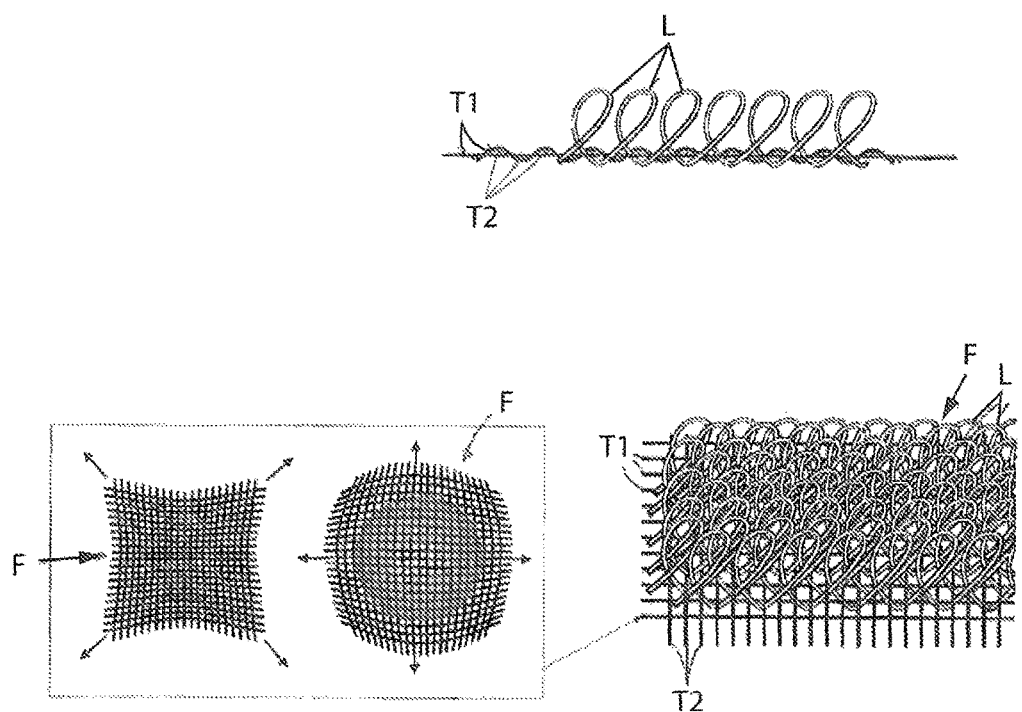
FIG. 44 illustrates a loop-type receptor fabric that may be employed in a cushion-type support member in accordance with the present invention.

As noted above, when a physical or mechanical engagement arrangement is employed between the device D and any of the illustrated and/or described cushion-type support members, the connection member such as 40, 40a may be replaced with a fabric that has mechanical engagement properties. Such a fabric is shown in FIG. 44 at F. As schematically illustrated, fabric F may be a woven or knit base fabric that includes a matrix of base threads such as shown at T1, T2, and also includes raised loop-type receptors L that are incorporated into the fabric F along with base threads T1, T2. Representatively, the threads T1, T2 of the base fabric may be formed of stretchable, resilient material such as a combination of polyester and spandex that enables the fabric F to be stretchable in both a warp direction and a weft direction. The loop-type receptors L, however, are representatively formed of a non-elastic material such as polyester and are interlaced, woven or knit into the fabric F so as to accommodate the elasticity and resiliency of the base fabric formed by threads T1, T2. When a panel, section or area of one of the cushion-type support members is formed using the fabric F, the entirety of the panel, section or area may be employed to engage a hook-type connector that is secured to or carried by the device D or other item to be engaged with or supported by the support member.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A cushion-type support arrangement and user interface device, comprising:
a user interface device having a front surface, a back surface, and a series of edges that define an outer periphery;
a cushion member defining an exterior and an interior comprising deformable cushion material;
a first connection member carried by the cushion member; and
a second connection member carried by the user interface device, wherein the first connection member on the cushion member is selectively and releasably engageable with the second connection member carried by the user interface device for releasably engaging the user interface device with the exterior of the cushion member;
wherein the cushion member and the first and second connection members are configured and dimensioned such that, when the user interface device is positioned on the cushion member by engagement of the second connection member with the first connection member, outer areas defined by the cushion member are located outwardly of the edges of the user interface device and are positioned about the outer edges of the user interface device, and wherein the deformable cushion material of the cushion member enables the cushion member to assume a first configuration when the user interface device is positioned in a first orientation in which the front surface of the user interface device faces upwardly, wherein a lower portion of the cushion member is supported on and conforms to an underlying support surface and underlies the back of the user interface device at a location thereabove so as to be positioned between the back of the user interface device and the underlying support surface, and further enables the cushion member to assume a second configuration different from the first configuration when the user interface device is positioned in a second orientation in which the user interface device is in an upright orientation so that the front surface of the user interface device can be viewed horizontally, wherein in the second configuration of the cushion member a lower portion of the cushion member is supported on and conforms to an underlying support surface and underlies a lower edge of the user interface device at a location thereabove so as to be positioned between the lower edge of the user interface device and the underlying support surface, while the first and second connection members are engaged with each other, to support the user interface device in the upright orientation.

2. The cushion-type support arrangement and user interface device of claim 1, wherein the user interface device comprises a tablet computer.

3. The cushion-type support arrangement and user interface device of claim 1, wherein the user interface device comprises a keyboard.

4. The cushion-type support arrangement and user interface device of claim 1, wherein the user interface device comprises a game controller.

5. The cushion-type support arrangement and user interface device of claim 1, wherein the first and second connection members comprise magnetically attractive connection members.

6. The cushion-type support arrangement and user interface device of claim 1, wherein the first and second connection members are mechanically engageable with each other.

7. The cushion-type support arrangement and user interface device of claim 6, wherein one of the first and second connection members comprises a hook material and the other of the first and second connection members comprises a loop material.

8. The cushion-type support arrangement and user interface device of claim 7, wherein at least a portion of the cushion-type support member is formed of a loop material having loop-type receptors throughout its surface area, and wherein a hook-type connection member is carried by the device and is engageable with the loop-type receptors at a plurality of locations on the surface area of the loop material.

9. The cushion-type support arrangement and user interface device of claim 1, wherein the first and second connection members comprise magnetically attractive connection members, and wherein the second magnetically attractive member is located within an interior defined by the item.

10. The cushion-type support arrangement and user interface device of claim 9, wherein the second magnetically attractive member comprises at least a portion of an internal structure of the item.

11. The cushion-type support arrangement and user interface device of claim 1, wherein the user interface device defines an exterior surface, and wherein the second connection member is secured to the exterior surface of the user interface device.

12. The cushion-type support arrangement and user interface device of claim 1, wherein the user interface device is carried by a protective device, and wherein the second connection member is carried by the protective device.

13. The cushion-type support arrangement and user interface device of claim 1, wherein the cushion member defines an exterior, and wherein the first connection member is located on the exterior of the cushion member.

14. The cushion-type support arrangement and user interface device of claim 1, wherein the first and second connection members comprise magnetically attractive connection members, and wherein the first magnetically attractive member is located in the interior of the cushion member.

15. The cushion-type support arrangement and user interface device of claim 1, wherein the user interface device includes a rechargeable battery, and further comprising an inductive charger carried by the cushion member for charging the rechargeable battery when the user interface device is engaged with the cushion member.

16. A method of supporting a user interface device, comprising the acts of:

providing a cushion member that includes a first connection member and an interior within which is disposed deformable cushion material;

providing a user interface device that includes a second connection member, and selectively and releasably engaging the second connection member with the first connection member;

wherein engagement of the second connection member with the first connection member is operable to releasably engage the user interface device with the cushion member;

wherein the user interface device has a front surface, a back surface, and a series of edges that define an outer periphery, and wherein the cushion member and the first and second connection members are configured and dimensioned such that, when the user interface device is positioned on the cushion member by engagement of the second connection member with the first connection member, outer areas defined by the cushion member are located outwardly of the edges of the user interface device and are positioned about the outer edges of the user interface device;

forming the deformable cushion material of the cushion member to configure the cushion member in a first configuration when the user interface device is positioned in a first orientation in which the front surface of the user interface device faces upwardly, wherein in the first configuration a lower portion of the cushion member is supported on and conforms to an underlying support surface and underlies the back of the user interface device at a location thereabove so as to be positioned between the back of the user interface device and the underlying support surface; and forming the deformable cushion material of the cushion member to configure the cushion member in a second configuration different from the first configuration when the user interface device is positioned in a second orientation in which the user interface device is in an upright orientation so that the front surface of the user interface device can be viewed horizontally, wherein in the second configuration of the cushion member a lower portion of the cushion member is supported on and conforms to an underlying support surface and underlies a lower edge of the user interface device at a location thereabove so as to be positioned between the lower edge of the user interface device and the underlying support surface, while the first and second connection members are engaged with each other, to support the user interface device in the upright orientation.

17. A support assembly and user interface device, comprising:

a user interface device having a front surface, a back surface, and a series of edges that define an outer periphery;

a cushion member defining an exterior and an interior comprising deformable cushion material;

a first connector member; and a second connector member;

wherein the first connector member is secured to and carried by the cushion member and the second connector member is secured to and carried by the user interface device wherein, when the first connector member is secured to the cushion member and the second connector member is secured to the user interface device, the first and second connector members are selectively and releasably engageable with each other to enable the user interface device to be supported by the cushion member;

wherein the cushion member and the first and second connection members are configured and dimensioned such that, when the user interface device is positioned on the cushion member by engagement of the second connection member with the first connection member, outer areas defined by the cushion member are located outwardly of the edges of the user interface device and are positioned about the outer edges of the user interface device, and wherein the deformable cushion material of the cushion member enables the cushion member to assume a first configuration when the user interface device is positioned in a first orientation in which the front surface of the user interface device faces upwardly, wherein in the first configuration a lower portion of the cushion member is supported on and conforms to an underlying support surface and underlies the back of the user interface device at a location thereabove so as to be positioned between the back of the user interface device and the underlying support surface, and further enables the cushion member to assume a second configuration different from the first configuration when the user interface device is positioned in a second orientation in which the user interface device is in an upright orientation so that the front surface of the user interface device can be viewed horizontally, wherein in the second configuration of the cushion member a lower portion of the cushion member is supported on and conforms to an underlying support surface and underlies a lower edge of the user interface device at a location thereabove so as to be positioned between the lower edge of the user interface device and the underlying support surface, while the first and second connection members are engaged with each other, to support the user interface device in the upright orientation.

18. The method of claim 16, wherein the first and second connection members comprise magnetically attractive connection members, and wherein the act of providing a user interface device that includes a second connection member is carried out by providing a user interface device having one or more second magnetically attractive members contained within an interior defined by the user interface device.

19. The method of claim 16, wherein the first and second connection members comprise magnetically attractive connection members, and wherein the act of providing a user interface device that includes a second connection member is carried out by securing a second magnetically attractive member to an exterior surface defined by the user interface device.

20. The method of claim 16, wherein the first and second connection members comprise mechanically engageable connection members, and wherein the act of providing a cushion member having a first connection member is carried out by providing a cushion member having a first mechanical engagement member, and wherein the act of providing a user interface device that includes a second connection member is carried out by securing a second mechanical engagement member to the back surface of the user interface device.

21. The support assembly of claim 17, further comprising an adhesive device for selectively securing the second connection member to the exterior of the user interface device.

22. The support assembly of claim 17, wherein the second connection member is adapted to be secured to an exterior surface defined by the user interface device.

23. The support assembly of claim 17, wherein the first and second connector members comprise magnetically attractive connection members.

24. The support assembly of claim 17, wherein the first and second connector members comprise mechanical engagement members.

\* \* \* \* \*